US012457666B2

(12) United States Patent
Kluver

(10) Patent No.: US 12,457,666 B2
(45) Date of Patent: Oct. 28, 2025

(54) METHODS AND APPARATUS FOR THE REMOVAL OF SNOW AND ICE FROM CRANE BOOMS

(71) Applicant: Jared Kluver, Loveland, CO (US)

(72) Inventor: Jared Kluver, Loveland, CO (US)

( * ) Notice: Subject to any disclaimer, the term of this patent is extended or adjusted under 35 U.S.C. 154(b) by 0 days.

(21) Appl. No.: 18/715,035

(22) PCT Filed: Dec. 1, 2022

(86) PCT No.: PCT/US2022/051556
§ 371 (c)(1),
(2) Date: May 30, 2024

(87) PCT Pub. No.: WO2023/034653
PCT Pub. Date: Mar. 9, 2023

(65) Prior Publication Data

US 2024/0430992 A1 Dec. 26, 2024

Related U.S. Application Data

(60) Provisional application No. 63/285,409, filed on Dec. 2, 2021.

(51) Int. Cl.
*B66C 23/88* (2006.01)
*E01H 8/08* (2006.01)
*H05B 3/56* (2006.01)

(52) U.S. Cl.
CPC ................. *H05B 3/56* (2013.01); *E01H 8/08* (2013.01)

(58) Field of Classification Search
CPC .................................... H05B 3/56; E01H 8/08
See application file for complete search history.

(56) References Cited

U.S. PATENT DOCUMENTS 2,090,156 A * 8/1937 Scholz ..................... H02G 7/16 191/29 R
2,905,918 A * 9/1959 Wagner, Jr. .............. H05B 3/56 219/528

(Continued)

FOREIGN PATENT DOCUMENTS

CN 2830483 Y 10/2006
CN 101512071 A 8/2009

(Continued)

OTHER PUBLICATIONS

European Patent Application No. 22865663.3 file Jun. 24, 2024. First named Inventor: Kluver. Search Report dated Dec. 19, 2024, 5 pages.

(Continued)

*Primary Examiner* — Edward F Landrum
*Assistant Examiner* — Kuangyue Chen
(74) *Attorney, Agent, or Firm* — Santangelo Law Offices, P.C.

(57) ABSTRACT

Removal of snow and ice from crane booms (3) is disclosed. A heat source (13) may apply heat to an unobstructed movement element travel space (10) of a crane boom (3). A space available mount (12) of the heat source (13) may occupy an available remainder space (11) of a crane boom (3). A space available mount (12) may be a wire assembly (18) having a heating wire (19) disposed within a channel (20). Heat applied from a heat source (13) may melt snow or ice in an unobstructed movement element travel space (10) of a crane boom (3).

28 Claims, 13 Drawing Sheets

(56) References Cited

U.S. PATENT DOCUMENTS

| | | | | |
|---|---|---|---|---|
| 3,648,017 | A | 3/1972 | Obata | |
| 3,833,774 | A * | 9/1974 | Mills | B66C 13/12 137/355.16 |
| 3,894,635 | A | 7/1975 | Reich | |
| 4,051,466 | A | 9/1977 | Protze | |
| 4,388,523 | A | 6/1983 | Keep, Jr. et al. | |
| 4,391,425 | A | 7/1983 | Keep, Jr. | |
| 4,429,845 | A | 2/1984 | Stover et al. | |
| 5,203,072 | A | 4/1993 | Boisture | |
| 5,941,482 | A | 8/1999 | Santagata | |
| 6,102,333 | A | 8/2000 | Gerardi et al. | |
| 6,147,308 | A | 11/2000 | Santagata | |
| 6,547,187 | B2 | 4/2003 | Foster | |
| 6,854,562 | B2 | 2/2005 | Kwak | |
| 6,943,319 | B2 | 9/2005 | Jones | |
| 8,820,683 | B2 | 9/2014 | Stonestreet, II et al. | |
| 8,857,635 | B2 | 10/2014 | Weckbecker et al. | |
| 9,568,137 | B2 | 2/2017 | Heise et al. | |
| 10,361,551 | B2 | 7/2019 | Heise | |
| 2009/0072091 | A1 | 3/2009 | Al-Khalil | |
| 2010/0243811 | A1 | 9/2010 | Stothers | |
| 2016/0258124 | A1 | 9/2016 | Johnston | |
| 2019/0010670 | A1 | 1/2019 | Falldin | |

FOREIGN PATENT DOCUMENTS

| | | | |
|---|---|---|---|
| CN | 201457092 | U | 5/2010 |
| CN | 206302127 | U | 7/2017 |
| CN | 111218915 | A | 6/2020 |
| CN | 111894338 | A | 11/2020 |
| CN | 111960270 | A | 11/2020 |
| CN | 118339341 | A | 7/2024 |
| EP | 4441293 | A2 | 10/2024 |
| JP | H02210174 | A | 8/1990 |
| JP | H08105001 | A | 4/1996 |
| JP | 2024543212 | A | 11/2024 |
| KR | 20240113564 | A | 7/2024 |
| MX | 2024006298 | A | 7/2024 |
| WO | 2001067816 | A1 | 9/2001 |
| WO | 2008034746 | A1 | 3/2008 |
| WO | 2023034653 | A2 | 3/2023 |

OTHER PUBLICATIONS

Prime Wire & Cable PHC42W06 6ft. Pipe Heating Cable, https://www.google.com/shopping/product/8689991952794886089?q=c, Accessed Nov. 3, 2022, 3 pages.

Easyheat 2502 Freeze Free Heating Cable 500'https://www.google.com/shopping/product/14200051247487970790?q, Accessed Nov. 3, 2022, 3 pages.

Ritche Cable Heater | Thiesen's Home & Auto https://www.theisens.com/products/cable-heater/109080086/?gclid=EA, Accessed Nov. 3, 2022, 3 pages.

About Us—Thermal Flex Systems, https: //tflexsys.com/about-us/. Accessed Nov. 3, 2022, 3 pages.

Crane Rail Heating—Thermal Flex Systems, https://tflexsys.com/crane-rail-heating-2/, Accessed Nov. 3, 2022.

Crane Rail Heating Cable—Thermal Flex Systems, https://tflexsys.com/crane-rail-heating-2/crane-rail-heating-cable/, Nov. 3, 2022.

Crane Rail Heating Controls—Thermal Flex Systems, https://tflexsys.com/crane-rail-heating-2/crane-rail-heating-controls/, Accessed Nov. 4, 2022.

Factory Crane Rail Heating—Thermal Flex Systems, https://tflexsys.com/crane-rail-heating-2/factory-crane-rail-heating/, Accessed Nov. 4, 2022.

Outdoor Crane Rail Heating, https://tflexsys.com/crane-rail-heating-2/outdoor-crane-railheating/, Accessed Nov. 4, 2022.

Kluver, Jared. Photo of testing for experimentation on a crane of prototype of claimed invention, view from a vantage point not accessible to the public, Nov. 2019, 1 page.

Industrial Grade Heating Cable—Thermal Flex Systems, https://tflexsys.com/crane-rail-heating-2/outdoor-crane-rail-heating/, Accessed Nov. 4, 2022, 1 page.

Flexible Switch Heater Rail Elements—Thermal Flex Systems, Accessed Nov. 4, 2022, 1 page.

U.S. Appl. No. 63/285,409, filed Dec. 2, 2021. First named inventor: Kluver.

International Patent Application No. PCT/US2022/051556, filed Dec. 1, 2022. First named inventor: Kluver.

International Patent Application No. PCT/US2022/051556, filed Dec. 1, 2022. First named inventor: Kluver. International Search Report dated Mar. 1, 2023, 2 pages.

International Patent Application No. PCT/US2022/051556, filed Dec. 1, 2022. First named inventor: Kluver. Written Opinion of the International Searching Authority dated Mar. 1, 2023, 3 pages.

Thermal Flex Systems, https://tflexsys.com/, Accessed Nov. 4, 2022.

Counterpart European Patent Application No. 22865663.3 file Jun. 24, 2024. First named Inventor: Kluver. Examination Report dated Jan. 16, 2025, 5 pages.

Counterpart Chinese Patent Application No. 202280080109.3 file Jun. 3, 2024. First named Inventor: Kluver. Office Action dated Jan. 15, 2025, 7 pages.

Counterpart European Patent Application No. 22865663.3 file Jun. 24, 2024. First named Inventor: Kluver. Result of Consultation dated Aug. 5, 2025, 5 pages.

Counterpart Chinese Patent Application No. 202280080109.3 file Jun. 3, 2024. First named Inventor: Kluver. Notice to Undergo Registration Procedures and a Notice to Grant Patent Right dated Jul. 1, 2025, 2 pages.

Counterpart Chinese Patent Application No. 202280080109.3 file Jun. 3, 2024. First named Inventor: Kluver. Patent Certificate dated Sep. 12, 2025, provided along with English Translation, 2 pages.

* cited by examiner

METHODS AND APPARATUS FOR THE REMOVAL OF SNOW AND ICE FROM CRANE BOOMS

PRIORITY CLAIM

This application is the United States National Phase of PCT International Patent Application Number PCT/US2022/051556, filed Dec. 1, 2022, which claims priority to and the benefit of U.S. Provisional Application No. 63/285,409, filed Dec. 2, 2021, each such patent application and any priority case hereby incorporated herein by reference in its entirety.

TECHNICAL FIELD

Embodiments of the present inventive technology may include methods and apparatus to remove snow and ice from all or various parts of cranes. While cranes of all kinds and the totality of their inclusive structures and parts are within the scope of the disclosure of the inventive technology, the inventive technology may have applicability to removing snow and ice from rails or other structural members on the booms of tower cranes.

BACKGROUND

It may be known that snow, sleet, ice, and the like may complicate crane operations. Snow and ice in particular may accumulate on crane structures and parts and create problems. The problems they pose may include interference with lifted objects being placed as desired, interference with one or more trolleys moving along a crane boom, capacity issues by adding weight to the crane boom and to lifted objects, compromised visibility to the crane operator or operators, and the like.

Conventional techniques for removing snow and ice may involve spray chemicals that remove snow, ice, and the like, manually scraping away or using a trolley to break up snow, ice, and the like, or simply waiting for sunlight, warming temperatures, and natural elements to melt snow, ice, and the like. These may entail significant disadvantages.

For example, spray methods may involve the use of mobile units to spray deicing chemicals, and it may be the case that such mobile units typically may not be able to reach one or more parts of a crane, such as the crane's boom area. Spray chemicals also may pose health and environmental hazards, perhaps requiring special handling and disposal. Moreover, when using solution-based systems, the deicing solution typically may be sprayed over an entire piece of equipment, for example in the manner of deicing an airplane, which may create a mess. Further, these spraying systems typically may be found on mobile units and may not reach all areas of a crane, including for example the boom area of a crane. The term deicing as used herein may be understood as by those having skill in the relevant art, but regardless should be understood to involve removing snow and/or ice from a surface.

Manual scraping methods frequently may involve a crane operator walking the length of the boom to carry out the technique, such as by going from side to side with a scraper and scraping and then dusting away all snow and ice for many feet while being hundreds of feet in the air with very minimal working platform or bracing to work off of. This may pose risks even in good weather and may certainly increase the risk in bad weather, where surfaces may be slick and visibility may be poor, creating conditions that may be very slippery and dangerous.

Waiting for sunlight and warming temperatures naturally may create down-time where the crane may not be able to be operated. Depending on the weather and sun, this may take many hours to complete. This may cause inefficiencies on busy job sites, such as where many people on a site may need the crane for job site tasks.

Using the trolley of a crane to break up snow and ice, such as by action of the trolley's wheels, may pose drawbacks such as damage to one or more components of the crane and/or wearing or ruining the trolley wheels. Such damage, wear and ruination may cause the crane to shut down until the issue can be fixed, again creating downtime for the crane and possibly adding the expense of potentially costly repairs. Moreover, breaking ice and snow in this manner may send chunks of ice falling to the ground below, which may be hazardous to employees, structures, and equipment on the ground when this task is being performed.

It may be known to use silicone pads that are bonded to objects that need to be heated. However, these pad systems may not be capable of being made to the lengths or widths that may be required for use on cranes due to the size of the heating wire that is used inside these pads. Moreover, these kinds of silicone pads may be self-regulated and may not have protections to prevent their overheating. The pads also may be bulky, may require a relatively large surface area, or may be difficult or involved to install.

The form and structure of cranes and elements thereon, such as crane booms, also may pose problems for the removal of snow and ice. For example, crane booms may be long and narrow and may have compact, irregular, or otherwise difficult areas to access that may hinder conventional snow and ice removal techniques or make them non-effective.

Tower cranes may pose particular issues when it comes to the removal of accumulated snow and ice. Tower cranes generally may include a vertical mast, tower, or the like to support a working boom in an elevated position off the ground. Loads may be suspended from the working boom. These considerations may require that the weight of the boom and any loads suspended from the boom may need to be supported entirely by the single mast, and not, for example, by multiple masts or other multiple supports (as may be the case, for example, for gantry cranes or the like) or, obviously, by the ground (as may be the case, for example, by the rails of railroad tracks or the like). These design considerations for tower cranes may mean that tower crane booms may have features that perhaps distinguish them from other kinds of cranes, such as lightweight or perhaps even hollow structural members, structural members that may be compact and may have a high strength to weight ratio, structural members that may be streamlined in form and configuration and that may be designed to minimize or even eliminate unnecessary surface area or extraneous features such as irregular surfaces, structural members that must allocate or reserve space or surface area for critical support elements (such as where the laces of a boom may be joined to rails or other components of the boom that the laces support), structural members arranged in configurations critical to supporting the weight of the boom and loads thereon (such as the manner in which laces may be arranged for connection to one another and to rails and/or other structural members of the boom), structural members the integrity of which may be prohibited or otherwise not be capable of alteration, modification, or other like compromise such as by welding, drilling, or the like in as much as these may affect the strength and/or load bearing capacity of the boom, structural members that may not have openings or other irregular forms or cutouts thereon, structural members that may require unblocked or otherwise readily accessible spaces to permit safety, regulatory, or other kinds of inspections, structural members that may have tight tolerances and clearances for moving parts thereon such as for cables, hoists, trolleys, and the like, and even perhaps such other issues and aspects specific to tower cranes that may be known by those having skill in such art.

In sum, conventional techniques for removing snow and ice from cranes may present significant risk factors, entail significant impracticalities, and may generate significant down time that may interfere with personnel on a job site needing the crane for job site tasks.

The foregoing problems related to conventional removal of snow and ice from cranes may represent a long-felt need for an effective solution to the same. While some of the implementing elements may have been available, actual attempts to meet this need may have been lacking to some degree. This may have been due to a failure of those having ordinary skill in the art to fully appreciate or understand the nature of the problems and challenges involved. As a result of this potential lack of understanding, attempts to meet these long-felt needs may have failed to effectively solve one or more of the problems or challenges here identified. These attempts may even have led away from the technical directions taken by the present inventive technology and may even result in the achievements of the present inventive technology being considered to some degree an unexpected result of the approach taken by some in the field.

DISCLOSURE OF THE INVENTION

The present inventive technology includes a variety of aspects, which may be selected in different combinations based upon the particular application or needs to be addressed. In various embodiments, the inventive technology may include the removal of snow and ice from cranes, crane structures, crane booms, and rails on crane booms, including all of the foregoing with applicability to tower cranes.

One goal of the present inventive technology may include removing snow and ice from cranes.

Another goal of the present inventive technology may include removing snow and ice from cranes with applicability to tower cranes.

Another goal of the present inventive technology may include removing snow and ice with applicability to the booms of tower cranes.

Another goal of the present inventive technology may include removing snow and ice with applicability to rails of booms of tower cranes.

Naturally, other goals and objects of the present inventive technology are disclosed throughout the text, clauses, and claims.

MODE(S) FOR CARRYING OUT THE INVENTION

It should be understood that embodiments include a variety of aspects, which may be combined in different ways. The following descriptions are provided to list elements and describe some of the embodiments of the application. These elements are listed with initial embodiments; however, it should be understood that they may be combined in any manner and in any number to create additional embodiments. The variously described examples and preferred embodiments should not be construed to limit the embodiments of the application to only the explicitly described systems, techniques, and applications. The specific embodiment or embodiments shown are examples only. The specification should be understood and is intended as supporting broad claims as well as each embodiment, and even claims where other embodiments may be excluded. Importantly, disclosure of merely exemplary embodiments is not meant to limit the breadth of other more encompassing claims that may be made where such may be only one of several methods or embodiments which could be employed in a broader claim or the like. Further, this description should be understood to support and encompass descriptions and claims of all the various embodiments, systems, techniques, methods, devices, and applications with any number of the disclosed elements, with each element alone, and also with any and all various permutations and combinations of all elements in this or any subsequent application.

Embodiments of the present inventive technology may include a tower crane boom rail (4) heat application apparatus (5). Embodiments of the present inventive technology also may include methods for melting snow or ice on a rail of a boom (3) of a tower crane (1).

Figure 2:
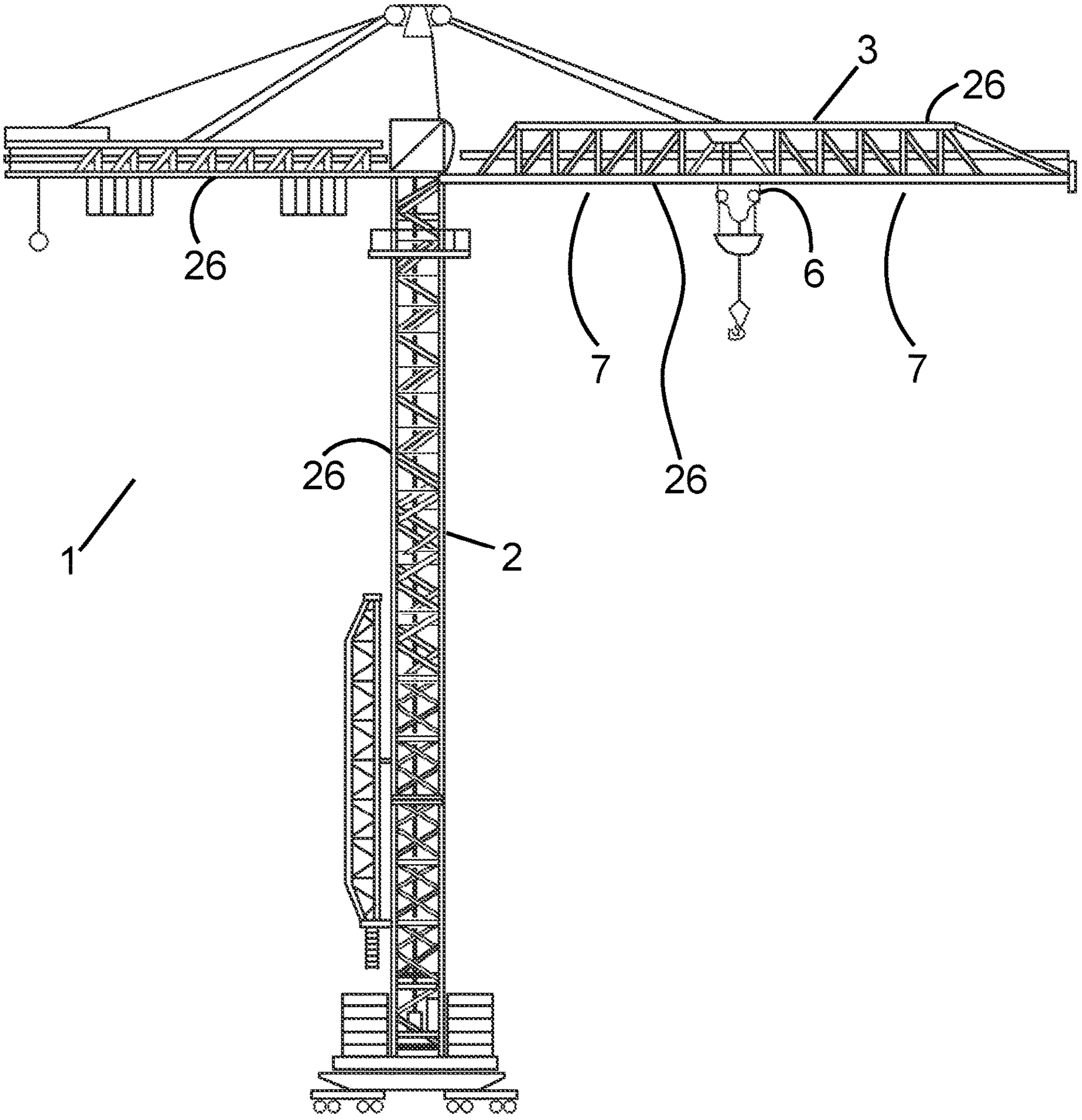
FIG. 2 shows a non-limiting example of a tower crane in an exemplary embodiment.
Figure 3:
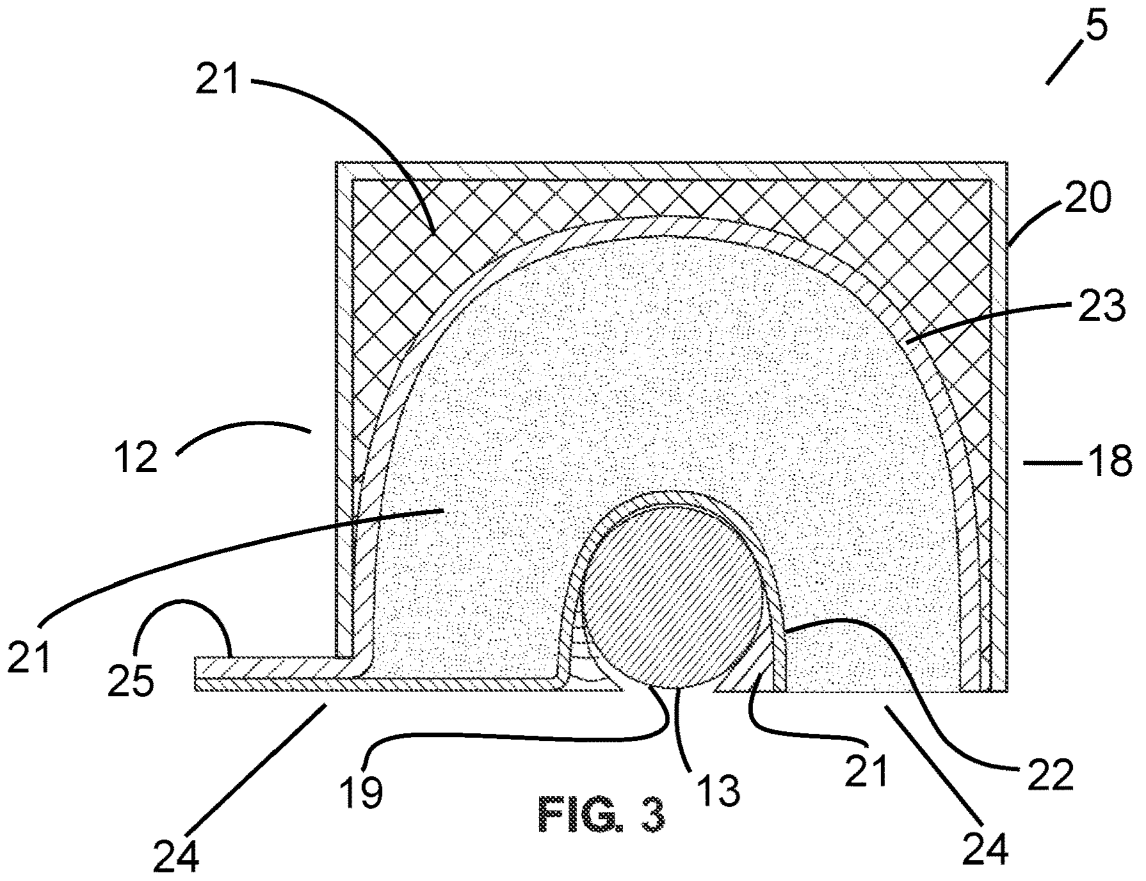
FIG. 3 shows a non-limiting example of a cross sectional view of a wire assembly in one exemplary embodiment.
Figure 4:
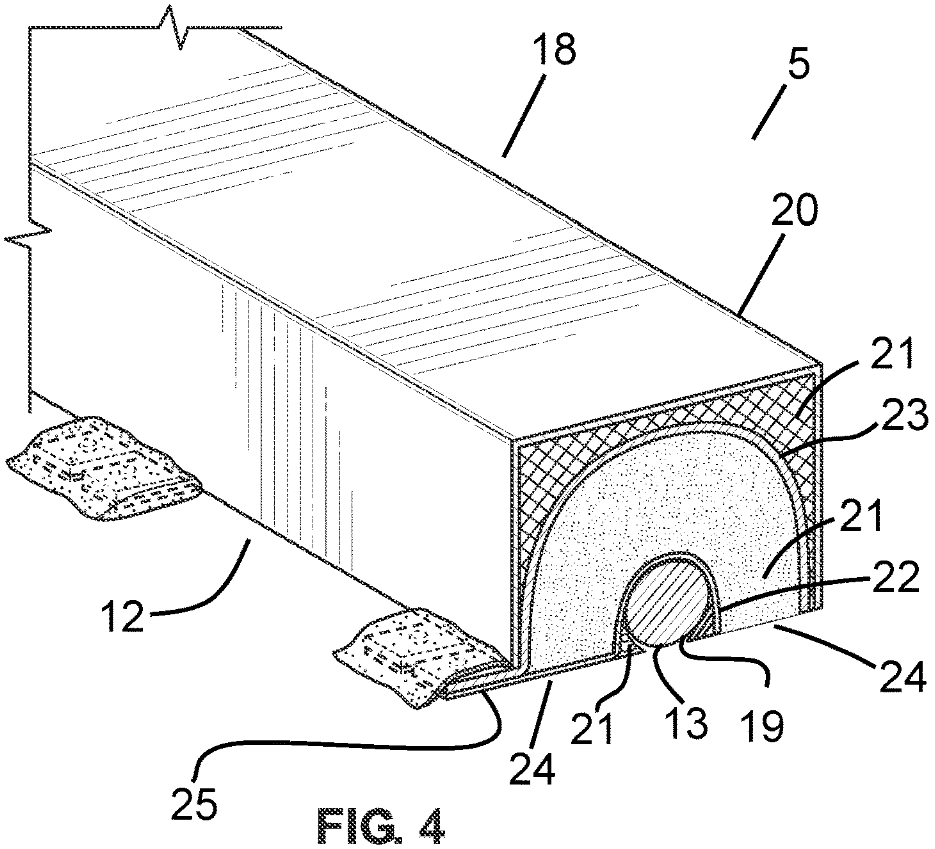
FIG. 4 shows a non-limiting example of a perspective view of a wire assembly in one exemplary embodiment.
Figure 5:
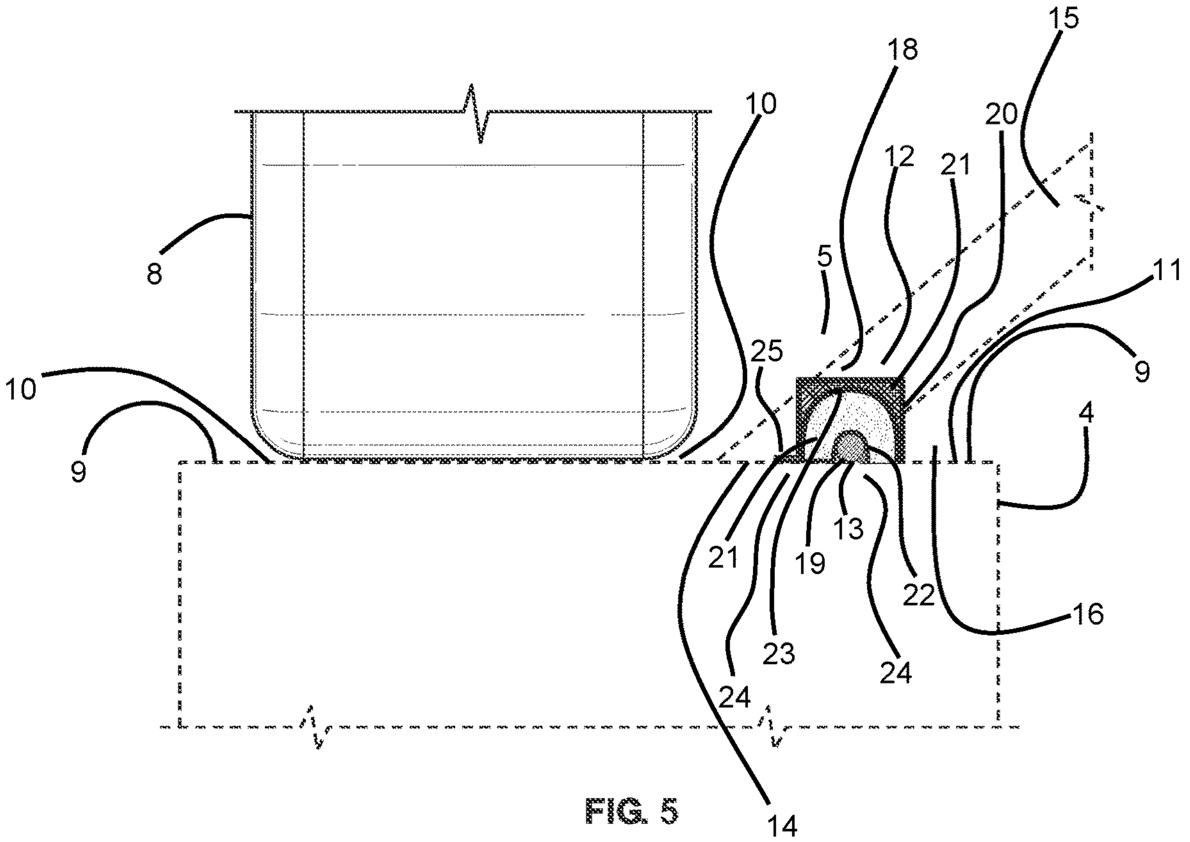
FIG. 5 shows a non-limiting example of a cross sectional view of a flat surface portion of a tower crane boom rail in one exemplary embodiment.
Figure 6:
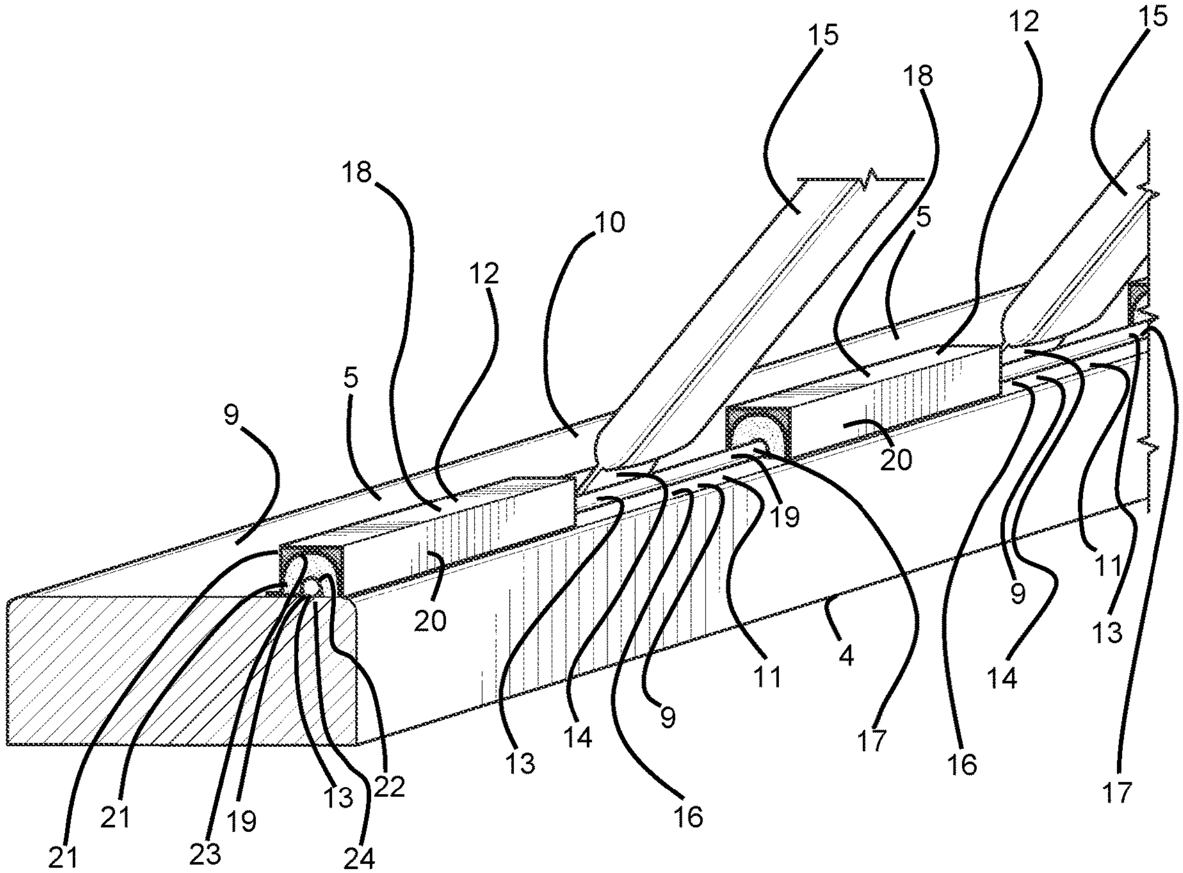
FIG. 6 shows a non-limiting example of a perspective view of a flat surface portion of a tower crane boom rail in one exemplary embodiment.
Figure 7A:
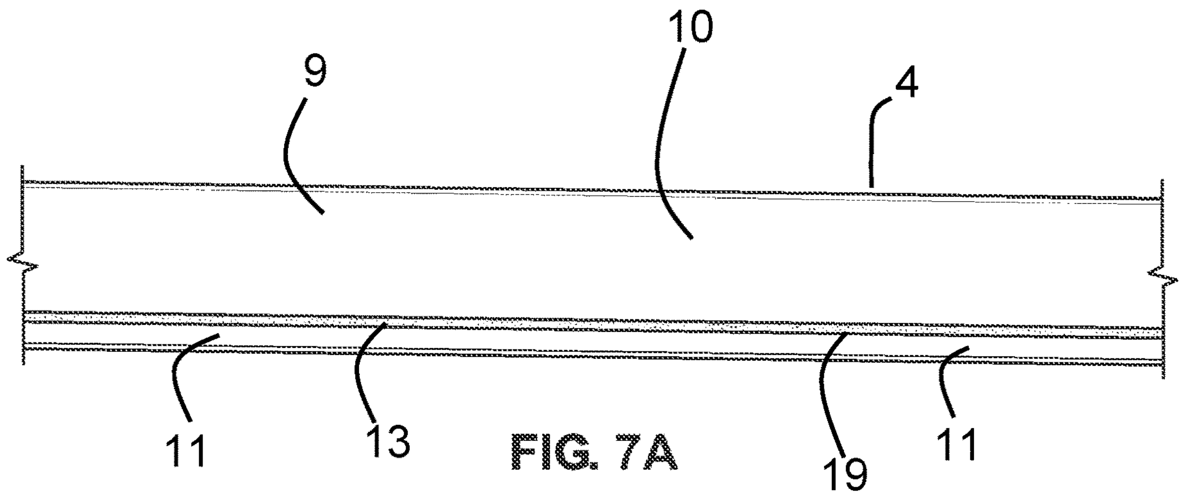
FIGS. 7A, 7B, and 7C show a non-limiting example of steps for the installation of a wire assembly in one exemplary embodiment.
Figure 7B:
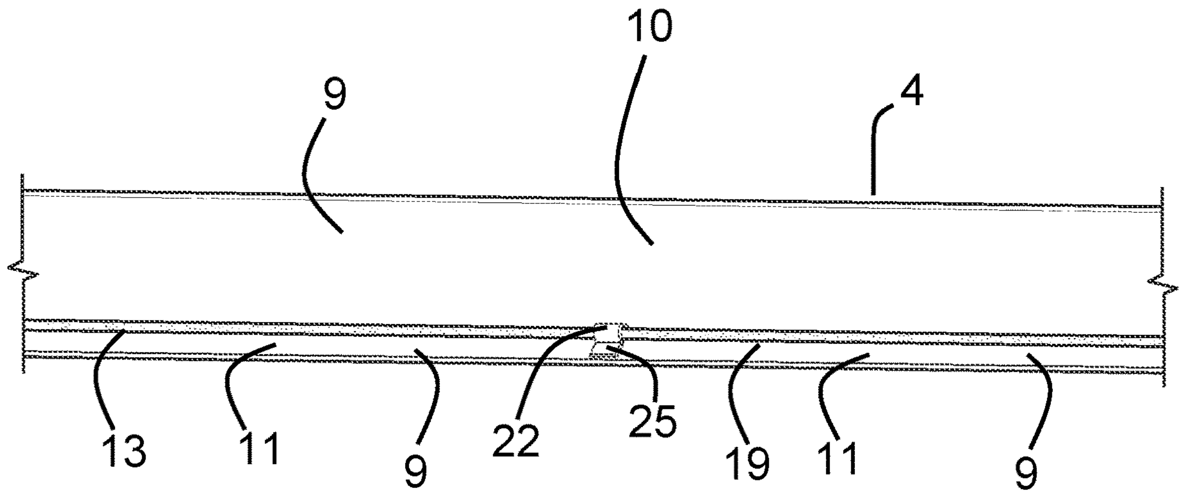
Figure 7C:
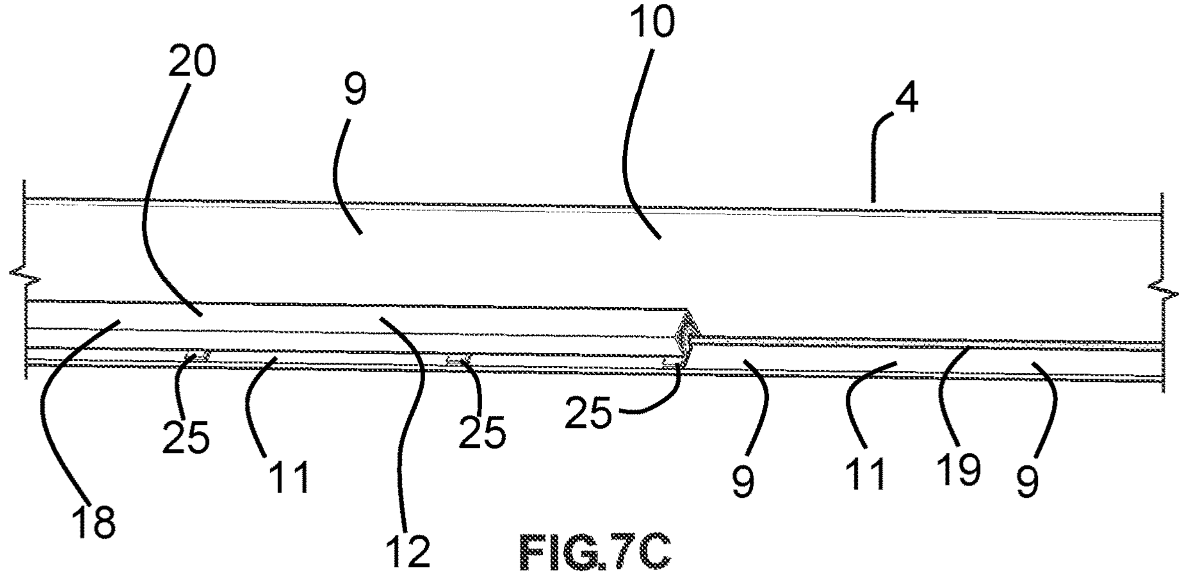
Figure 8:
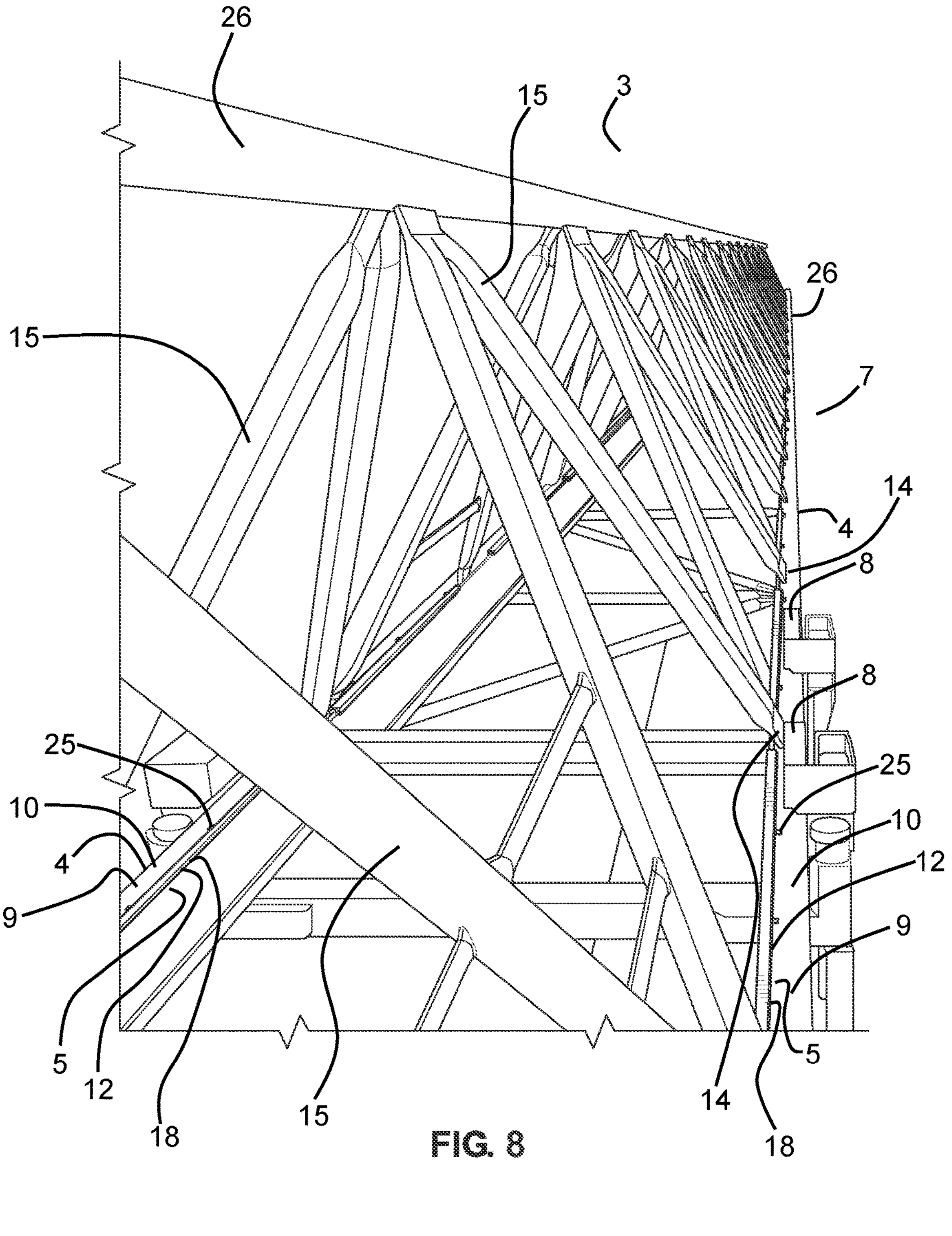
FIG. 8 shows a non-limiting example of wire assemblies on tower crane boom rails in one exemplary embodiment.
Figure 9:
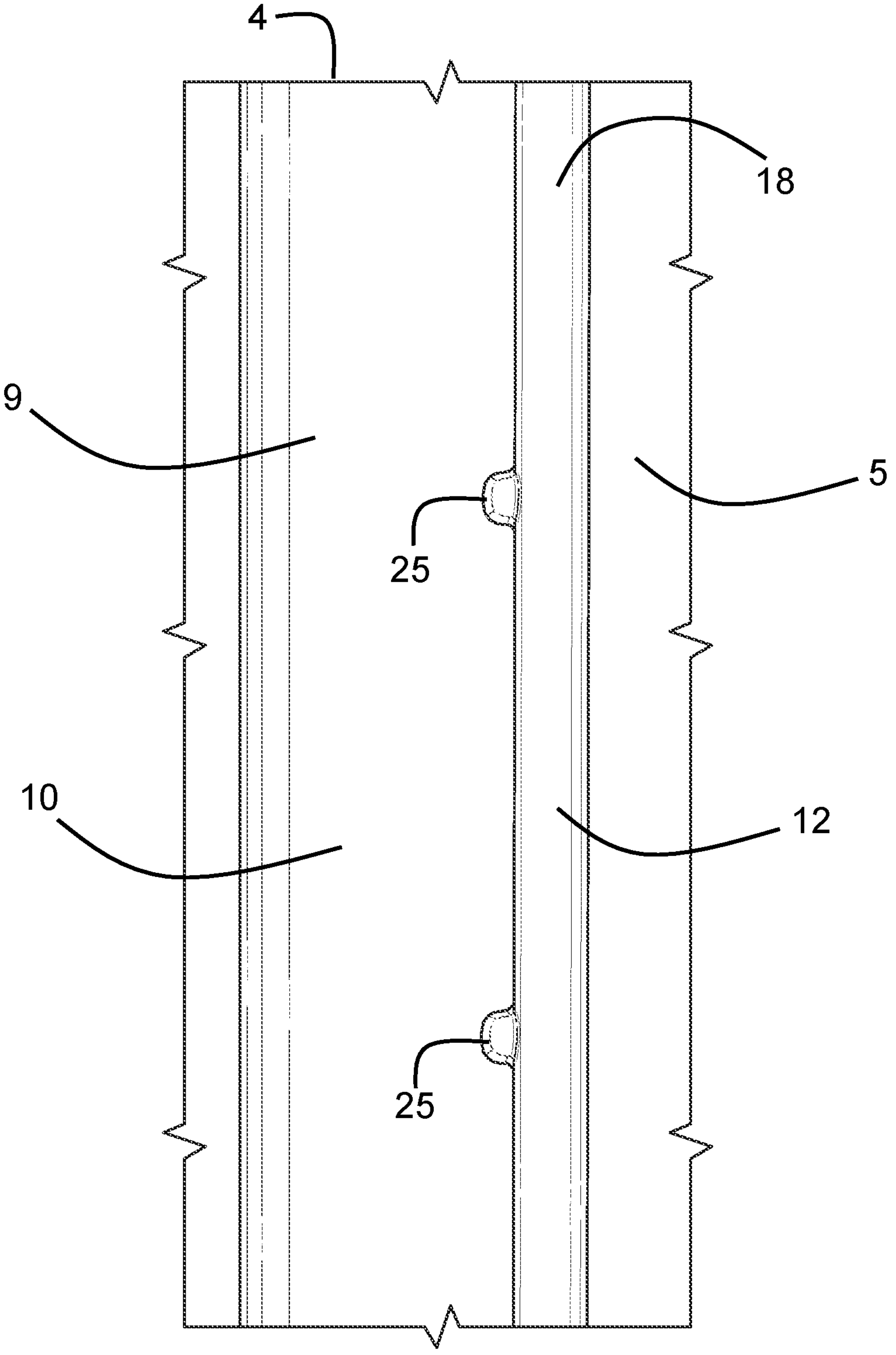
FIG. 9 shows a non-limiting example of tabs extending beyond a wire assembly in one exemplary embodiment.
Figure 10:
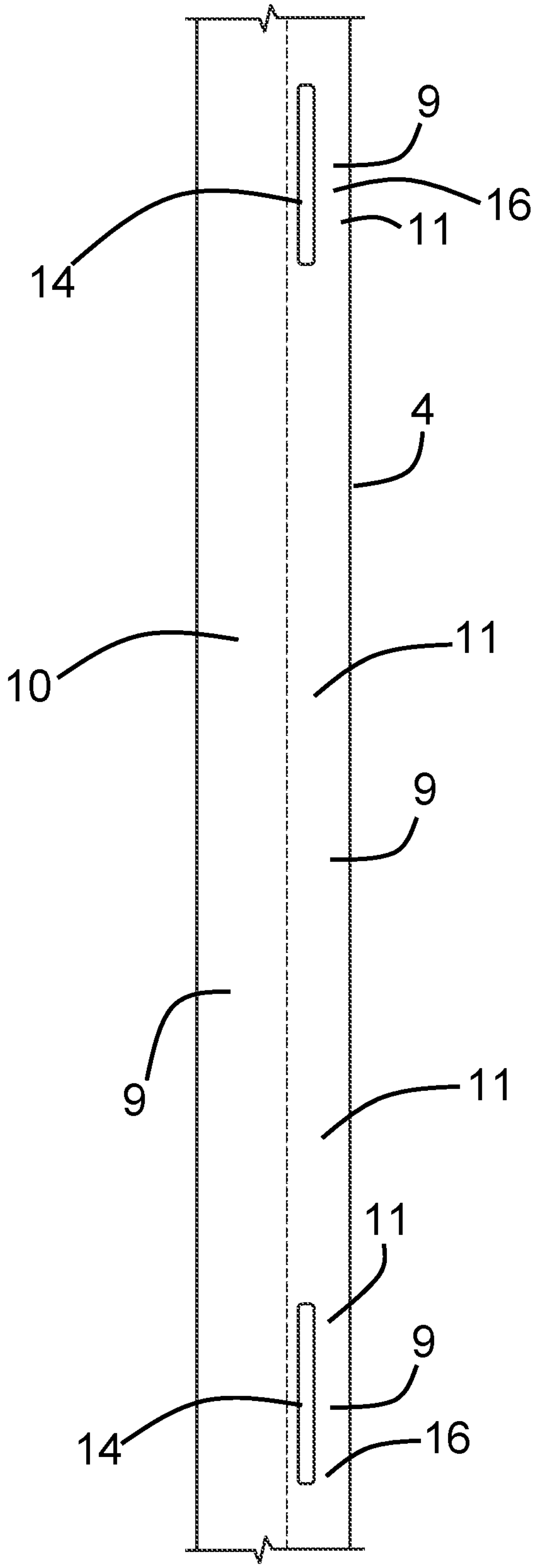
FIG. 10 shows a non-limiting example of lace footprint spaces in one exemplary embodiment.
Figure 11:
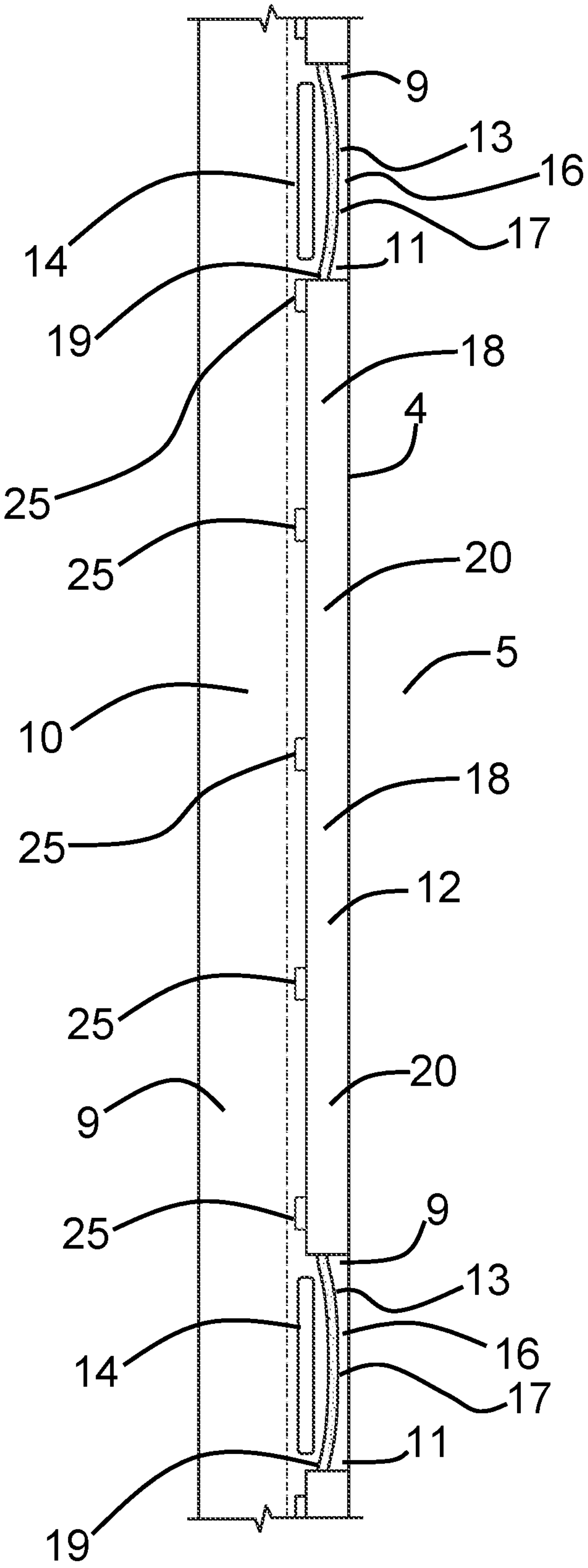
FIG. 11 shows a non-limiting example of wire assemblies disposed between lace footprint spaces in one exemplary embodiment.

As shown for example in FIG. 2, a tower crane (1) generally may have a mast (2) and a boom (3). A tower crane boom rail (4) may be shown in an exemplary embodiment in FIG. 8. The rail (4) may be such as to permit movement of an object or element to translate along the rail (4), and in various embodiments may be its own piece or part supported on the boom (3) or may be integrated into or combined with another piece or part of the boom (3).

The tower crane boom rail (4) may be of any kind suitable for use or application to or on a tower crane (1) and may be of any kind generally known in the art of tower cranes. In some embodiments, a tower crane boom rail (4) may be a rectangular tube. Examples may be shown in FIGS. 5, 6, 13, and 14. The rectangular tube of course may have dimensions suitable for use or application to or on a tower crane (1) or as may be generally known in the art of tower cranes. In some embodiments, the rectangular tube may be a 5 inch by 5 inch rectangular tube, an approximately 5 inch by approximately 5 inch rectangular tube, a rectangular tube having one side having a width from 2 inches wide to 10 inches wide, a rectangular tube having one side having a width from approximately 2 inches wide to approximately 10 inches wide, an up to 6 inch by up to 6 inch rectangular tube, and a rectangular tube having dimensions otherwise consistent with the disclosure herein.

Figure 1:
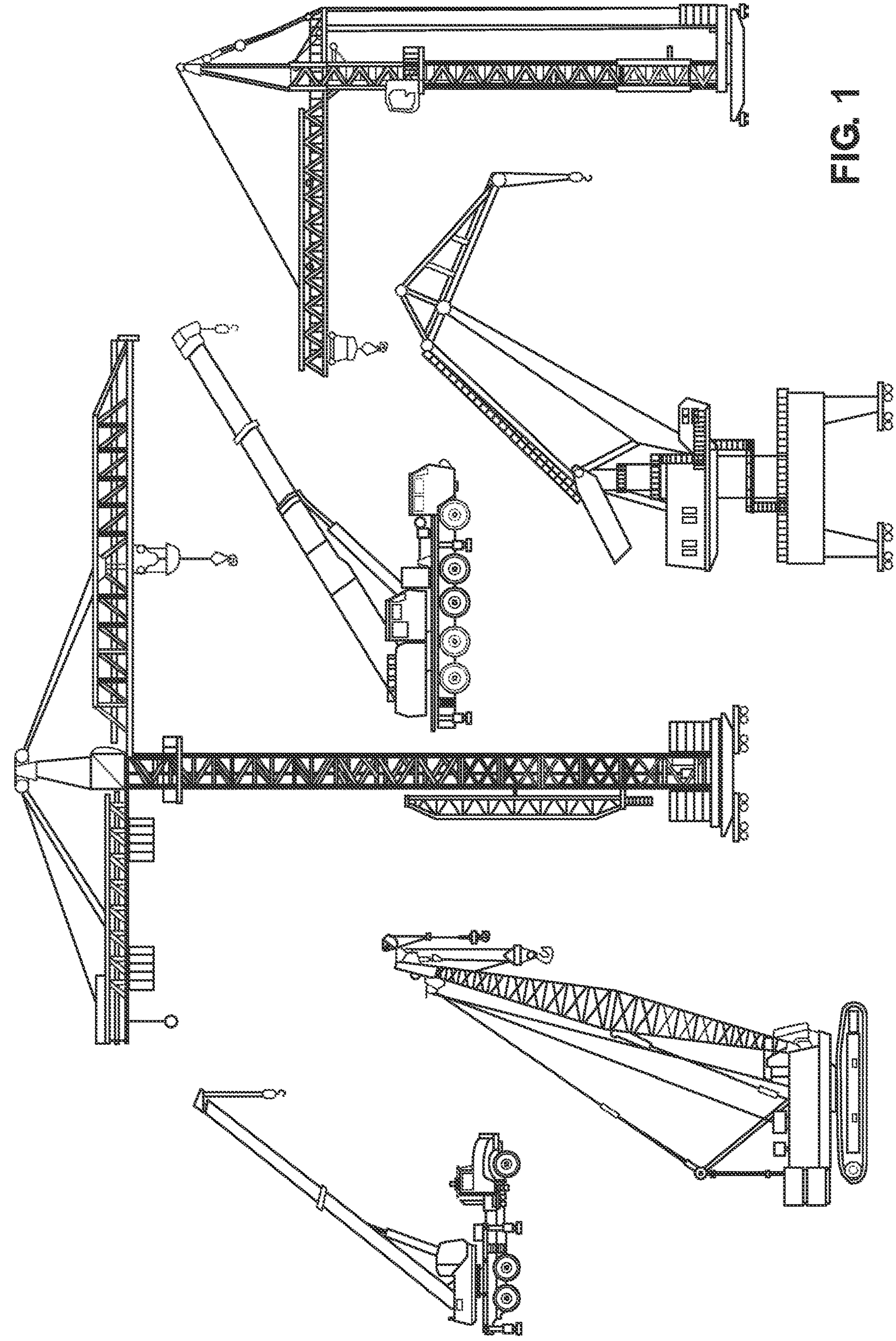
FIG. 1 shows non-limiting examples of various kinds of cranes in exemplary embodiments.

A tower crane boom (3) may have a length (7) and a trolley (6) configured for movement along at least a portion of the length (7). Such configuration may involve any form, structure, or attribute of the trolley (6) allowing it to move along the boom (3), including but not limited to as may be known generally in the art for tower cranes and as may be described herein with respect to the disclosure of tower crane boom rails (4) and movement elements (8) of trolleys (6). Examples may be shown in FIGS. 1, 2, and 14.

Various embodiments may involve a tower crane boom rail (4) disposed along the portion of the length (7) of the tower crane boom (3) with which the trolley (6) moves in its movement along the portion of such length (7). Examples may be shown in FIGS. 2 and 8. As previously mentioned, the rail (4) may be such as to permit movement of an object or element to translate along the rail (4), and in various embodiments may be its own piece or part supported on or with the boom (3) or may be integrated into or combined with another piece or part of the boom (3). With respect to a trolley (6), the rail (4) with which the trolley (6) may move may be understood to include any suitable kind not otherwise inconsistent with the disclosure herein that permits the trolley (4) to move thereon or otherwise by use thereof, and in various embodiments may accommodate one or a plurality of a wheel, caster, roller, slider, magnet, flat surface, rounded surface, raised surface, grooved surface, and the like.

Various embodiments may involve at least one movement element (8) of the trolley (6) configured to use a surface (9) of the tower crane boom rail (4) for its movement along the portion of the length (7). Examples may be shown in FIGS. 5, 8, 13, and 14. The movement element (8) may be any piece, part, or component of or for use with or by the trolley (6) that enables the trolley (6) to move, and such configuration to use the surface (9) of the rail (4) may be of any kind suitable by which the movement element (8) makes use of the rail (4). For example, in various embodiments the movement element (8) may be one or a plurality of a wheel, caster, roller, slider, magnet, flat surface, rounded surface, raised surface, grooved surface, and the like that may be accommodated by the rail (4) to permit movement thereon.

Various embodiments may involve an unobstructed movement element travel space (10) of the surface (9) of the tower crane boom rail (4) through which a movement element (8) of the trolley (6) is configured to move. This may simply be the space at and, to the degree required, in the vicinity of, the surface (9) necessary for the movement element (8) to travel through as the movement element (8) moves along the rail (4) using the surface (9), and such configuration of the movement element (8) simply may be such as to permit the movement element (8) to move through such space. The term unobstructed may be understood to involve such space being free of any obstructions that would block, impede, interfere, or otherwise prevent such travel of the movement element (8). Notably, a space available mount (12) of a heat source (13) may be seen not to constitute such an obstruction, as may be discussed more fully elsewhere herein. By way of non-limiting example of the foregoing, where the movement element (8) is a roller that rolls along a top surface (9) of a rail (4), the unobstructed movement element travel space (10) simply may be the space at and above the surface (9) of the rail (4) through which the roller is required to move through as the roller rolls upon the rail (4). Examples may be shown in FIGS. 5, 6, 8, 10, and 11.

Various embodiments may involve an available remainder space (11) of the surface (9) of the tower crane boom rail (4) exclusive of the unobstructed movement element travel space (10). This may be the remaining space available at and, to the degree required, in the vicinity of, the surface (9) of the rail (4) that a space available mount (12) of heat source (13) may occupy, such that the space available mount (12) does not occupy any space of the unobstructed movement element travel space (10). In this sense, it may be seen that the available remainder space (11) is exclusive of the unobstructed movement element travel space (10) because the space of the available remainder space (11) cannot occupy, and therefore excludes, any and all of the space of the unobstructed movement element travel space (10) (otherwise the space available mount (12) would or would potentially obstruct movement of the movement element (8) through the unobstructed movement element travel space (10)). Examples may be shown in FIGS. 5, 6, 10, and 11.

An available remainder space (11) in various embodiments may have a substantially smooth surface. This may be a surface free of or substantially free of irregularities disrupting or tending to disrupt the smoothness of a surface, such a lips, flanges, ledges, protuberances, pits, depressions, grooves, ridges, and the like. For example, the surfaces of tower crane booms (3) and tower crane boom rails (4) generally may have smooth or substantially smooth surfaces due to the design and use considerations specific to tower cranes as discussed elsewhere herein.

An available remainder space (11) in various embodiments may lack clamp sites. This may be understood to be the absence or substantial absence of structures on, in, or of the available remainder space (11) to which something may be clamped, such as to prevent attachment by clamping of a space available mount (12). For example, the surfaces of tower crane booms (3) and tower crane boom rails (4) generally may lack clamp sites due to the design and use considerations specific to tower cranes as discussed elsewhere herein.

An available remainder space (11) in various embodiments may be an available remainder space (11) without any openings. This may be understood to be the absence or substantial absence of openings on, in, or of the available remainder space (11) to which something may be attached, connected, or otherwise joined, such as might otherwise prevent attachment, connection, or joining of a space available mount (12). For example, the surfaces of tower crane booms (3) and tower crane boom rails (4) generally may not have such openings due to the design and use considerations specific to tower cranes as discussed elsewhere herein.

An available remainder space (11) in various embodiments may have an uncompromisable structure. This may involve the available remainder space (11) having a structure that cannot be modified, impacted, impaired, added to, removed from, interfered with, or otherwise affected in a manner that would diminish safety, functionality, or other characteristic attributes of a tower crane (1). For example, tower crane booms (3) and tower crane boom rails (4) generally may be engineered with precise tolerances, capacities, and other design and engineering considerations specific to tower cranes as discussed elsewhere herein that cannot be comprised without risking such safety or functionality considerations or for which compromise may be prohibited by regulatory or other legal prohibitions.

In some embodiments, an such an uncompromisable structure may be a weld prohibited structure, which may be understood to involve structures that cannot be compromised by welding or the like, such as for example otherwise might be useful or beneficial for attaching, connecting, or otherwise joining a space available mount (12) in or to an available remainder space (11) by such a weld.

In some embodiments, an such an uncompromisable structure may be a drill prohibited structure, which may be understood to involve structures that cannot be compromised by drilling or the like, such as for example otherwise might be useful or beneficial for attaching, connecting, or otherwise joining a space available mount (12) in or to an available remainder space (11) by such drilling.

In various embodiments, the size, shape, or other attributes of the available remainder space (11) may be dictated by the size, shape, or other attributes of the tower crane boom (3), such as the surface (9) of a rail (4), the movement element (8) of a trolley (6), an unobstructed movement element travel space (10), and the like. For example, in some embodiments the surface (9) of the tower crane boom rail (4) may be a flat surface portion of the tower crane boom rail (4), the movement element (8) of the trolley (6) may be a roller, the unobstructed movement element travel space (10) may be a roller path of the flat surface portion, and the available remainder space (11) may be an available remainder space (11) of the flat surface portion. The dimensions of the available remainder space (11) similarly may follow from the dimensions of the elements by which the available remainder space (11) is formed. For example, in some embodiments the flat surface portion may have a width of or approximately 5 inches, the roller may have a width of or approximately 2 inches, the roller path may have a width of or approximately 2 inches, and the available remainder space (11) of the flat surface portion may have a width of or approximately 3 inches.

In such embodiments, a flat surface portion of a tower crane boom rail (4) may simply be a surface (9) or portion of a surface (9) the rail (4) that is flat or substantially flat. A roller may be understood to be a piece, part, or component of something that rolls or enables movement through the action of rolling, and a roller path may be understood to include the path through which one or more rollers may travel to enable such movement. One example of an available remainder space (11) on flat surface portion may be shown in FIG. 5.

In various embodiments, an available remainder space (11) may be part or all of any or any combination of sides of a tower crane boom rail (4), including for example any side of a rectangular or square rail (4), an upward facing side of a rail (4), a vertical side of a rail (4), a downward facing side of a rail (4), a sloping side of a rail (4), and the like.

Some embodiments may further involve a lace footprint space (14). The lace footprint space (14) may be understood to include the space occupied on a tower crane boom rail (4) where a lace (15) of a tower crane boom (3) meets, attaches to, or otherwise is joined to the rail (4). Examples may be seen in FIGS. 6, 10, and 11. The lace footprint space (14) may have a clearance (16), which may be understood to be the space that other parts, pieces, or components of the rail (4) may need to occupy to avoid impacting, interacting, or otherwise interfering with the lace (15). For example, an unobstructed movement element travel space (10) may require such a clearance (16). However, it should be noted that various embodiments of the inventive technology may contemplate a clearance (16) of a lace (15) that is within the available remainder space (11) of the rail (4), again so as not to block, impede, interfere, or otherwise prevent the travel of a movement element (8) through the unobstructed movement element travel space (10). For example, embodiments may involve a lace footprint space (14) occupying a flat surface portion exclusive of a roller path and having a clearance within the available remainder space (11). The dimension of such a clearance naturally may follow from the dimensions of the flat surface portion, the roller, the roller path, and the lace footprint space (14), and in some embodiments may be a dimension not exceeding 0.5 inches or approximately 0.5 inches within the available remainder space (11).

In some embodiments, an available remainder space (11) may be a lace footprint restricted available remainder space (11). This may be understood to involve an available remainder space (11) that, in addition to being exclusive of an unobstructed movement element travel space (10), may have all or part of a lace footprint space (14) occupying some of the space that otherwise would be part of the available remainder space (11). In this sense, it may be understood that the lace footprint space (11) may further restrict the space of the available remainder space (11). Embodiments accordingly may involve restricting an available remainder space (11) with a lace footprint.

Various embodiments may involve a heat source (13) configured to apply heat to the unobstructed movement element travel space (10) of the surface (9) of the tower crane boom rail (4). The heat source (13) may be of any kind suitable to apply such heat that is otherwise consistent with the disclosure herein. Configuration to apply heat also may be of any suitable kind otherwise consistent with the disclosure herein, and may for example include application though direct contact, radiation, conduction, heat transfer, and the like. Embodiments accordingly may involve applying heat with a heat source (13) to an unobstructed movement element travel space (10) of a surface (9) of a tower crane boom rail (4). Examples may be seen in FIGS. 3, 4, 5, 6, and 13.

While a heat source (13) indeed may apply heat to the unobstructed movement element travel space (10), it may be understood that the heat source (13) may be capable of, and in various embodiments may be made to, apply heat to additional parts, pieces, or components of the tower crane (1), or even to such parts, pieces, or components of the tower crane (1) separately from or even in lieu of the unobstructed movement element travel space (10). Such parts, pieces, or components of the tower crane (1) may include, for example, some or all of a tower crane boom rail (4), any other kind of rail, a trolley (6), a movement element (8) of a trolley (6), a lace (15), a part, piece or component of mast (2), a part, piece or component of a boom (3), and the like. Moreover, a heat source (13) in various embodiments may be used with a thermostat to achieve desired levels or ranges of temperature output or to maintain a surface at a desired level or range of temperatures. Some embodiments may involve a thermostat in contact with or that otherwise measures a temperature of surface (9), a rail (4), or another part, piece, or component of a tower crane boom (3) or a tower crane (1).

A heat source (13) in various embodiments may be an elongate uniform distribution heat source, which may be understood to involve a heat source (13) capable of applying heat uniformly or substantially uniformly along a length, such as for example to apply heat uniformly or substantially uniformly to a tower crane boom rail (4). Embodiments accordingly may involve uniformly elongately distributing heat applied with a heat source (13).

A heat source (13) in various embodiments may be a rail symmetric heat source, which may be understood to involve a heat source (13) capable of applying heat from a position or positions that follow or substantially follow the length, shape, or other configuration of a rail (4). Embodiments accordingly may involve symmetrically applying heat with a heat source (13) to a tower crane boom rail (4).

A heat source (13) in various embodiments may be a heat source (13) sufficient to melt snow from an unobstructed movement element travel space (10) and/or a heat source (13) sufficient to melt ice from an unobstructed movement element travel space (10). In this manner, it may be seen that the heat source (13) may remove snow and ice in a manner that may allow one or more movement elements (8) to move through the unobstructed movement element travel space (10), perhaps for example to allow removal of snow and/or ice from a tower crane boom rail (4) to allow a trolley (6) to move there along. Embodiments accordingly may involve melting snow or ice in an unobstructed movement element travel space (10) of a surface (9) of a tower crane boom rail (4) as a result of applying heat, permitting movement of at least one movement element (8) of a trolley (6) through the unobstructed movement element travel space (10) as a result of such melting, and moving the trolley (6) on the tower crane boom rail (4) disposed along at least a portion of a length (7) of a tower crane boom (3) by using the surface (9) of the tower crane boom rail (4) to move at least one movement element (8) of the trolley (6) through the unobstructed movement element travel space (10).

In some embodiments, a heat source (13) may be a heating wire (19). The heating wire (19) may be of any kind suitable to apply heat consistent with the disclosure herein, and may be understood to include wires, wire pairs, cables, cords, lines, and the like, including having layers, jackets, insulation, and other constituent parts, pieces, components and the like. Examples may be seen in FIGS. 3, 4, 5, 7A, 7B, 7C, and 13. Embodiments accordingly may involve applying heat with a heating wire (19).

In various embodiments, a heating wire (19) may include a construction having a solid alloy/copper conductor(s) with a 0.240 inches diameter, may have insolation, may have compacted magnesium oxide insolation, may have an outer covering, may have an outer covering that is stainless steel sheathing, may have an outer covering that is seamless alloy 825 sheathing, may have a suitable operating voltage consistent with the disclosure herein, may have a 600 volt or approximately 600 volt operating voltage, may reach a maximum temperature of 1125 degrees Fahrenheit or up to 1125 degrees Fahrenheit, may reach a temperature of up to 200 degrees Fahrenheit in no less than 2 minutes, may reach a temperature of up to 300 degrees Fahrenheit in no less than 2 minutes, may reach a temperature of up to 400 degrees Fahrenheit in no less than 2 minutes, may reach a temperature of up to 450 degrees Fahrenheit in no less than 2 minutes, and may reach a temperature of up to 500 degrees Fahrenheit in no less than 2 minutes. In various embodiments, a heating wire (19) may heat to an absolute temperature value independent of the temperature of the ambient air. In various embodiments, a heating wire (19) may not require a heat sink, may not require a heat sink to mitigate or eliminate the risk of burnout, may not require a part, piece, or component of a tower crane (1) to act as a heat sink, and the like.

In some embodiments, a heating wire (19) may be a wire having a diameter not exceeding 0.24 inches or approximately 0.24 inches. Embodiments accordingly may involve applying heat with a heating wire (19) having a diameter not exceeding 0.24 inches or approximately 0.24 inches.

It should be understood that the heat source (13) described herein naturally need not be limited to applying heat to an unobstructed movement element travel space (10), but naturally may be capable of applying heat to any or all of a tower crane boom rail (4), any part, piece or component of a tower crane boom (3), any part, piece, or component of a tower crane mast (2), or any part, piece, or component of a crane.

Various embodiments may involve a space available mount (12) of a heat source (13) configured to occupy only said available remainder space (11) of said surface (9) of said rail (4), and may involve utilizing a space available mount (12) of a heat source (13) to secure the heat source (13) in the available remainder space (11) of a surface (9) of a tower crane boom rail (4) exclusive of the unobstructed movement element travel space (10) of the surface (9) of the tower crane boom rail (4). The mount may be anything suitable to position the heat source (13) exclusive of the unobstructed movement element travel space (10) but capable of applying heat to the unobstructed movement element travel space (10). A space available mount (12) may be understood to be a mount occupying only the available remainder space (11), and such configuration of the mount may be of any kind suitable to effect the same. Examples may be seen in FIGS. 3, 4, 5, 6, 7C, 9, 11, and 14.

In some embodiments a space available mount (12) may be a space available mount (12) configured not to impede the movement of a trolley (6) along a portion of the length (7) of the tower crane boom (3). Such configuration may involve any form, structure, or attribute of the space available mount (12) sufficient to prevent such impediment of the trolley (6) by the mount. Embodiments accordingly may involve not impeding the movement of the trolley (6) on a tower crane boom rail (4) with a space available mount (12).

In some embodiments a space available mount (12) may be a space available mount (12) configured not to impede an unobstructed movement element travel space (10). Such configuration may involve any form, structure, or attribute of the space available mount (12) sufficient to prevent such impediment of the unobstructed movement element travel space (10) by the mount. Embodiments accordingly may involve not impeding the movement of at least one movement element (8) of a trolley (6) through an unobstructed movement element travel space (10) with a space available mount (12).

In some embodiments, a space available mount (12) may be such a mount joined to a substantially smooth surface of an available remainder space (11). Embodiments accordingly may involve utilizing a space available mount (12) of a heat source (13) to secure the heat source (13) to a substantially smooth surface of an available remainder space (11).

In some embodiments, a space available mount (12) may be a space available mount (12) joined to a surface of an available remainder space (11) in direct contact, such as where some or all of the mount may directly contact some or all of a surface of the available remainder space (11). Embodiments accordingly may involve directly contacting a space available mount (12) to a surface (9) of an available remainder space (11).

In some embodiments, a space available mount (12) joined to a surface of an available remainder space (11) in direct contact may be a space available mount (12) joined to a surface of an available remainder space (11) with adhesive. An adhesive may be such as may be generally known and understood in the art, and may be understood to include one or more substances or techniques causing the mount to stick, bind, or otherwise hold fast to the surface involved. An adhesive may have particular utility and benefit in connection with the disclosure herein, such as to join the mount to a smooth surface, join the mount to a surface that otherwise may lack a clamp site, join the mount to a surface that otherwise may lack an opening, join the mount to a surface without drilling, join the mount to a surface without welding, join the mount to a surface without compromising a structure of the surface, and the like. In some embodiments, an exemplary adhesive that may be suitable for the applications disclosed herein in some embodiments may be J-B Weld®. Embodiments accordingly may involve adhering a space available mount (12) to a surface (9) of an available remainder space (11).

In some embodiments a space available mount (12) may be a space available mount (12) configured not to use a clamp. Such configuration may involve any form, structure, or attribute of the space available mount (12) by which the mount may be joined to a surface without using a clamp. Embodiments accordingly may involve not clamping a heat source (13) to an available remainder space (11).

In some embodiments a space available mount (12) may be a space available mount (12) configured not to use an opening of an available remainder space (11). Such configuration may involve any form, structure, or attribute of the space available mount (12) by which the mount may be joined to a surface without using such an opening. Embodiments accordingly may involve not using an opening of an available remainder space (11).

In some embodiments, a space available mount (12) may be a space available mount (12) configured not to compromise a structure of an available remainder space (11). Such configuration may involve any form, structure, or attribute of the space available mount (12) by which the mount may be joined to a surface without compromising a structure of the surface, as such compromise may be discussed elsewhere herein. Embodiments accordingly may involve not compromising a structure of an available remainder space (11).

In various embodiments such a space available mount (12) may be a space available mount (12) configured not to use a drilled structure or a space available mount (12) configured not to use a weld, as such drilling and such welding may be discussed elsewhere herein. Embodiments accordingly may involve not drilling an available remainder space (11), and embodiments may involve not welding an available remainder space (11).

In some embodiments, a space available mount (12) may be a space available mount (12) configured not to impede the inspection of a lace (15). The laces (15) of tower cranes (1) may be required to be inspected, such as by regulation, law, or other safety protocol, for example at the point where the laces (15) of a boom (3) may be joined to rails (4) or other components of the boom (3) that the laces (15) support, to ensure the connection (often, a weld) is sound. Such configuration not to impede an inspection may involve any form, structure, or attribute of the space available mount (12) sufficient to prevent such an impediment, for example by not blocking the relevant part of a lace (15) requiring inspection, or by being able to be moved out of the way of such relevant part of a lace (15) during an inspection. Embodiments accordingly may involve not impeding an inspection of a lace with a space available mount (12).

In some embodiments, a space available mount (12) may be a wire assembly (18) having a heating wire (19) disposed within a channel (20). The wire assembly (18) may be understood to include simply all of or one or more parts, pieces, or components of the space available mount (12) of the heat source (13) in which the heat source (13) is a heating wire (19). The channel (20) may be of any kind suitable to receive a length of the heating wire (19) therein, such as sized and shaped in the form of a gutter, groove, furrow, or the like, or such as having a cross section in the shape of a U, a V, three sides of a rectangle or a square, or the like. In various embodiments, applying heat with a heat source (13) may involve applying heat with a heating wire (19) disposed within a channel (20) of a wire assembly (18). Examples may be seen in FIGS. 3, 4, 5, 6, 7C, 8, 9, 11, and 14.

In some embodiments the channel (20) may have a width at its cross-sectional opening not exceeding 0.625 inches or approximately 0.625 inches, and a heating wire (19) may have a cross-sectional width or diameter not exceeding 0.24 inches or approximately 0.24 inches.

The wire assembly (18) in various embodiments may have a fill material (21) between the channel (20) and the heating wire (19). In this manner, the fill material (21) may fill some or all of the open space within the channel (20) not occupied by heating wire (19). Embodiments accordingly may involve applying heat with a heating wire (19) disposed within a channel (20) of a wire assembly (18) having a fill material (21) between the channel (20) and the heating wire (19). Examples may be seen in FIGS. 3, 4, 5, and 6.

In some embodiments, the fill material (21) may be a heat conduction fill material (21). This may serve to conduct heat radiated or otherwise provided by heating wire (19) through the fill material (21), and in some embodiments, to another surface at which the fill material (21) may be in contact. For example, where a wire assembly (18) may be in direct contact with a surface (9) of a rail (4), the fill material (21) may increase the area through which heat is conducted from the wire assembly (18) compared to the area through which heat is conducted by the heating wire (19) alone. Embodiments accordingly may involve conducting heat with a fill material (21).

In some embodiments, the fill material (21) may be an insulation fill material (21). For example, where the ambient air outside of the channel (20) may be colder than the temperature of the heat radiated or otherwise provided by the heating wire (19), the fill material (21) may serve to insulate the heating wire (19) (and perhaps even a surface against which the heating wire (19) and/or the wire assembly (18) is in contact) from cold contamination by the cold ambient air. Embodiments accordingly may involve insulating a heating wire (19) with a fill material (21).

In some embodiments, the fill material (21) may be a heating wire stabilization fill material (21). For example, the fill material (21) may provide bulk or support for the heating wire (19) within the channel (20) that may limit or eliminate the ability of the heating wire (19) to migrate its position or otherwise move within the channel (20). Embodiments accordingly may involve stabilizing a heating wire (19) with a fill material (21).

In some embodiments, the fill material (21) may be a fixed fill material (21), as in for example hard, solid, not plastic, or otherwise not capable of moving or allowing movement. Embodiments accordingly may involve applying heat with a heating wire (19) disposed within a channel (20) of a wire assembly (18) having a fixed fill material (21) between the channel (20) and the heating wire (19).

In some embodiments, the fill material (21) may be a fluid fill material (21), as wherein the fill material may have plasticity or may be capable of flowing, such as to fill a confined space or to flow around and among structures in a confined space. Embodiments accordingly may involve applying heat with a heating wire (19) disposed within a channel (20) of a wire assembly (18) having a fluid fill material (21) between the channel (20) and the heating wire (19).

In some embodiments, the fill material (21) may be a sealant, such as a silicone sealant, a high strength silicone sealant, and the like. Embodiments accordingly may involve applying heat with a heating wire (19) disposed within a channel (20) of a wire assembly (18) having a sealant, silicone sealant, or high strength silicone sealant between the channel (20) and the heating wire (19).

In some embodiments, the wire assembly (18) may have at least one wire strap (22) having at least a portion disposed against the heating wire (19), at least one channel strap (23) having at least a portion disposed against the channel (20), and a fluid fill material (21) that fills the remaining space within the channel (20). In this manner, the wire strap (22) may serve to hold, stabilize, or otherwise secure the heating wire (19) by contact against the wire strap (22), and the channel strap (23) may serve to hold, stabilize, or otherwise secure the channel (20) by contact against the channel strap (23). In embodiments where the wire assembly (18) has a base (24), the straps further may serve to hold, stabilize, or otherwise secure the heating wire (19) and the channel (20) by contact against a surface to which the base (24) may be adhered or otherwise joined. Embodiments accordingly may involve applying heat with a heating wire (19) disposed within a channel (20) of a wire assembly (18) having a fluid fill material (21) between the channel (20) and the heating wire (19), at least one wire strap (22) having at least a portion disposed against the heating wire (19), at least one channel strap (23) having a portion disposed against the channel (20), and wherein the fluid fill material (21) fills the remaining space within the channel (20). Examples may be seen in FIGS. 3, 4, 5, and 6.

Figure 12:
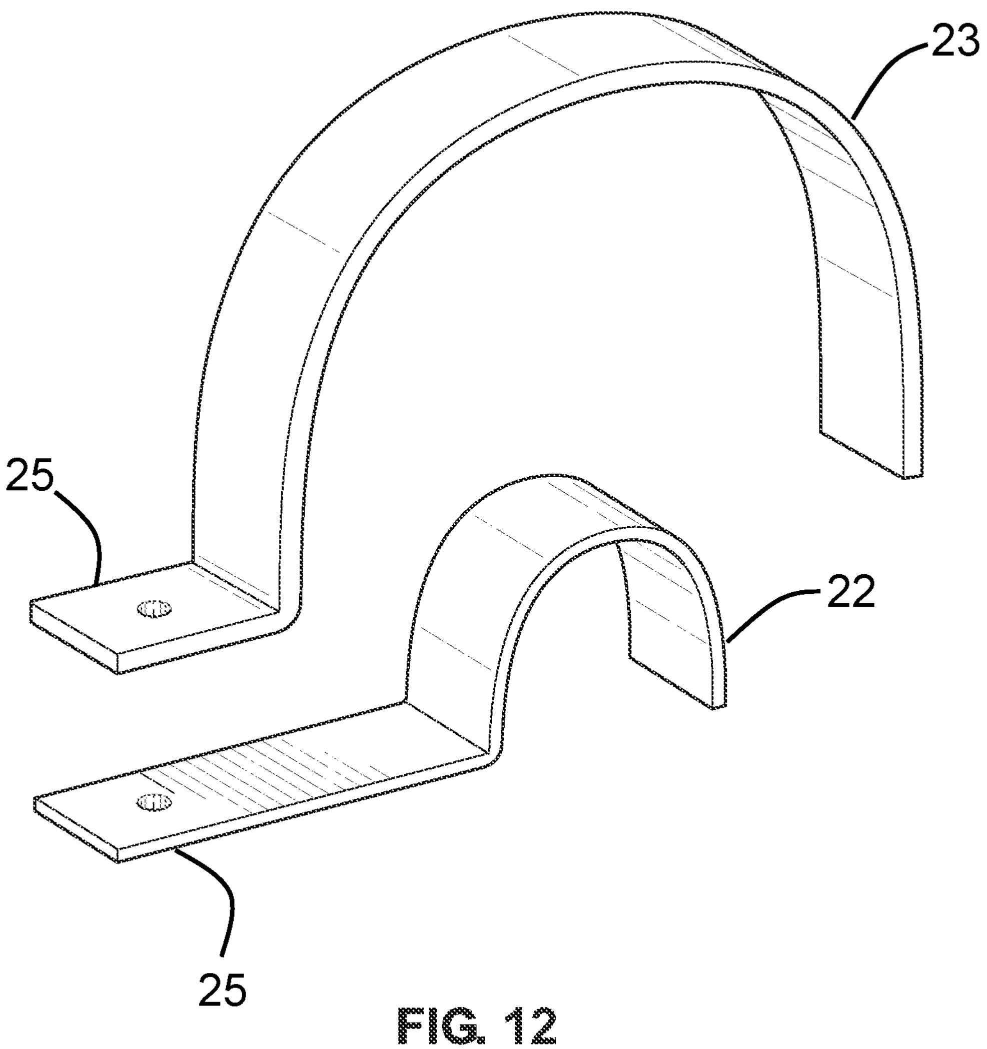
FIG. 12 shows a non-limiting example of a channel strap and a wire strap in one exemplary embodiment.
Figure 13:
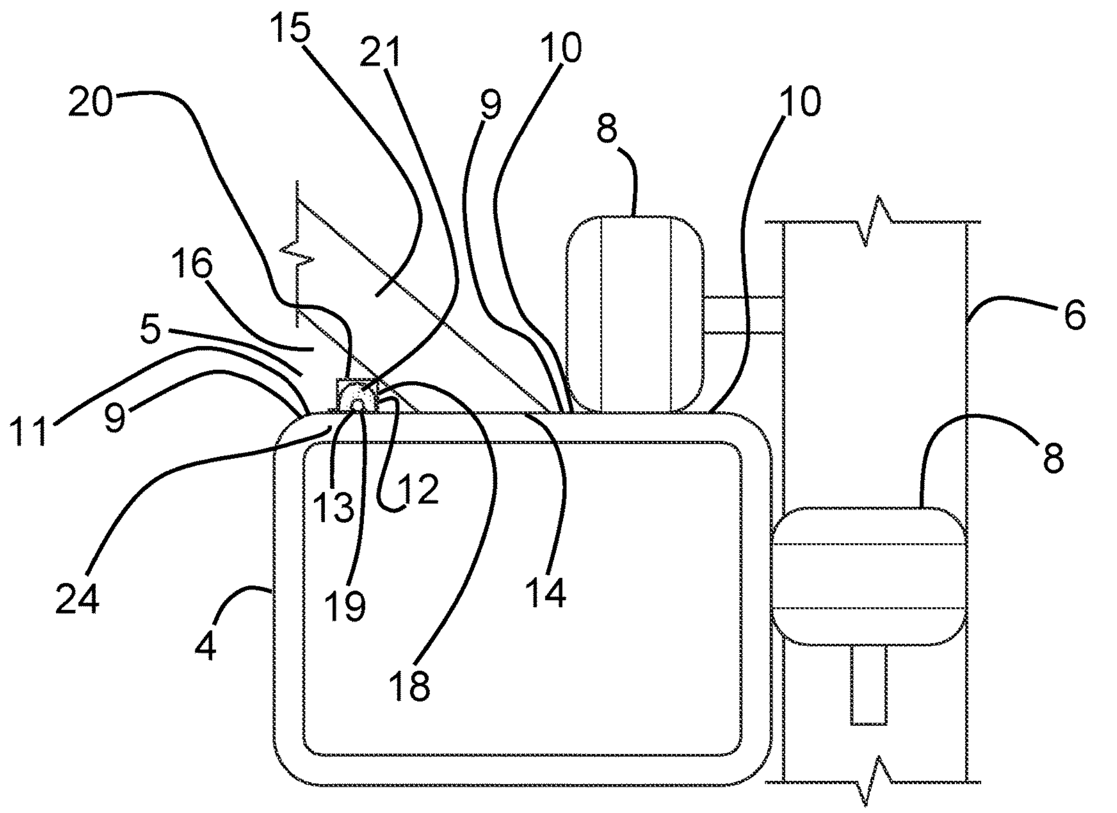
FIG. 13 shows a non-limiting example of an end view of a tower crane boom rail heating apparatus in one exemplary embodiment.
Figure 14:
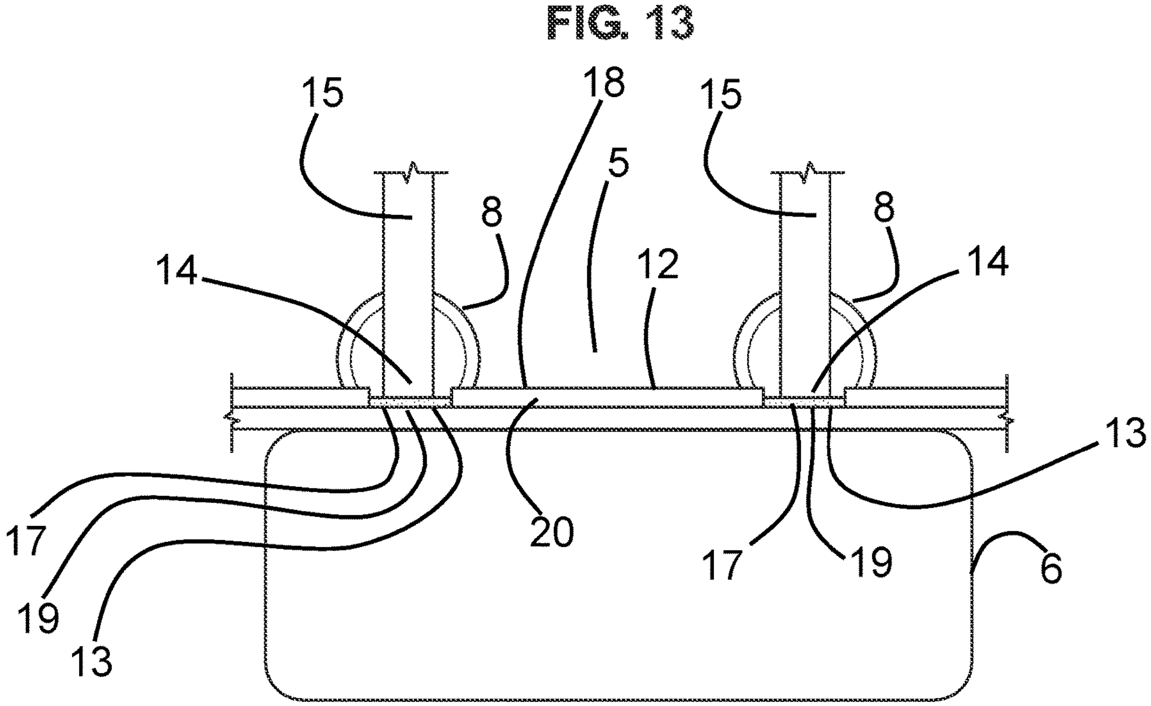
FIG. 14 shows a non-limiting example of a side view of a tower crane boom rail heating apparatus in one exemplary embodiment.

Wire straps (22) and channel straps (23) may be any kind suitable consistent with the disclosure herein. In some embodiments, such straps may be one-hole straps. Examples may be seen in FIG. 12.

In some embodiments, at least a portion of at least one channel strap (23) may be welded to the channel (20), for example to an inside surface of the channel (20).

In various embodiments, at least one wire strap (22) and at least one channel strap (23) may be an adjacent strap pair. This may involve the straps positioned within the channel (20) so as to be in side-by-side contact or near side-by-side contact with one another, including perhaps, in embodiments where the straps have tabs, the tabs may form a common or near continuous footprint on a surface that the tabs may be adhered to or otherwise in contact with.

In some embodiments, the channel (20) may be a rectangular or square channel (20), and some or all of the straps may be rounded straps. In such embodiments, a fluid fill material (21) naturally may fill the space between the rounded straps and the inside of the rectangular or square channel (20) within which the straps may be disposed. Examples may be seen in FIGS. 3 and 4.

In some embodiments, one or more wire straps (22) and/or channel straps (23) may have a tab (25). The tab (25) may form a generally lateral extension of the strap suitable, for example, for adhering or making other contact with a surface that the strap may be disposed against. In various embodiments, the tab or tabs (25) of straps disposed within a channel (20) may extend beyond the channel (20), such as in various embodiments extending up to 0.5 inches beyond the channel (20). In this manner, a wire assembly (18) may have one or more tabs (25) extending generally laterally beyond the edge of a channel (20). Where straps are arranged within the channel (20) as adjacent strap pairs, the tabs (25) may be seen to form a common or near continuous footprint extending generally laterally from the wire assembly (18) on a surface to which the wire assembly (18) may be adhered or otherwise in contact with. Examples may be seen in FIGS. 3, 4, 9, 11, and 12.

In various embodiments, one or more tabs (25) may be joined to a surface (9) of an available remainder space (11) with adhesive. In this manner, the tabs (25) may secure or assist in securing a wire assembly (18) to the surface (9) of the available remainder space (11). Where adjacent strap pairs are used, the resulting common or near continuous footprint of the tabs (25) may provide a larger area for the placement and utilization of adhesive compared to non-adjacent strap pairs, which may confer increased efficacy in adhesion and securement of the wire assembly (18) against the surface (9). Examples may be seen in FIGS. 5, 6, 8, 9, and 11.

In various embodiments, a channel (20), heating wire (19), and fill material (21) may form the base (24) of a wire assembly (18). For example, the fill material (21) may fill the space within the channel (20) so as to stabilize and position the heating wire (19) and provide a generally smooth and flat surface that closes off the open portion of the channel (20), for example such that the base (24) may be formed from the opposed edges of the channel (20), the smooth and flat surface of the fill material (21), and a surface of the heating wire (19). Examples may be seen in FIGS. 3 and 4. In embodiments having one or more straps, the straps may be disposed within the channel (20), and perhaps positioned and stabilized by the fill material (21), such that the open end and tab end of the strap may also form part of the base (24). At least a portion of the base (24) of a wire assembly (18) may be joined to a surface (9) of the available remainder space (11), such as with adhesive.

In various embodiments, a plurality of wire assemblies (18) may be disposed within the available remainder space (11) between a plurality of lace footprint spaces (14) of a tower crane boom rail (4). Examples may be seen in FIGS. 6, 8, 11, and 14. The wire assemblies (18) may be arranged, for example, one each between each pair of lace footprint spaces (14) along the rail (4) to enable a heating wire (19) to be run along the length of the rail (4). The heating wire (19) may apply heat to the rail (4) sufficient to heat the unobstructed movement element travel space (10) of the rail (4) and melt snow and/or ice that may be present. Embodiments accordingly may involve applying heat with a plurality of wire assemblies (18) disposed within an available remainder space (11) between a plurality of lace footprint spaces (14) of a tower crane boom rail (4).

In some embodiments, at least one wire assembly (18) may have a length of 68 inches, of approximately 68 inches, or of up to 68 inches.

In some embodiments, at least one wire assembly (18) may have a length of 53 inches, of approximately 53 inches, or of up to 53 inches.

Naturally, such foregoing lengths are merely exemplary, and a wire assembly (18) may have any suitable length to occupy a desired or required space between a pair of lace footprint spaces (14).

In some embodiments, a plurality of wire assemblies (18) may form a wire assembly section having a length. The length of a wire assembly section may be any as may be suitable consistent with the disclosure herein. In some embodiments, the length of a wire assembly section may 30 feet, may be approximately 30 feet, or may be up to 30 feet. Embodiments may involve the ability to connect multiple wire assembly sections together, for example to cover varying sizes, shapes, and configurations of rails (4) and/or other parts, pieces, or components of tower crane booms (3) or tower cranes (1).

Various embodiments may further involve at least one exposed heating wire section (17) within the available remainder space (11) connecting at least two wire assemblies (18) and clearing at least one lace footprint space (14). Examples may be seen in FIGS. 6 and 11. The exposed wire section (17) may eliminate one or more parts, pieces, or components of a wire assembly (18) to reduce the space required for the heating wire (19) to clear a lace footprint space (14) while staying within the available remainder space (11). For example, a clearance (16) around a lace footprint space (14) within an available remainder space (11) through which an exposed wire section (17) may be routed may not exceed 0.5 inches or approximately 0.5 inches in various embodiments. In embodiments, the full wire assembly (18) may be too big to fit this space, and so parts, pieces, or components may be eliminated at the clearance (16) to form the exposed wire section (17), which in some embodiments may be just the heating wire (19) itself. Embodiments accordingly may involve applying heat with at least one exposed heating wire section (17) within an available remainder space (11) connecting at least two wire assemblies (18) and clearing at least one lace footprint space (14), and may involve clearing at least one lace footprint space (14) within the available remainder space (11) with a clearance not exceeding 0.5 inches through which the exposed wire section (17) may be routed.

In some embodiments, the tower crane boom rail heat application apparatus (5) may be an apparatus having a heat source (13) configured to apply heat to the unobstructed movement element travel space (10) of the surface (9) of the tower crane boom rail (4) and a space available mount (12) of a heat source (13) configured to occupy only the available remainder space (11) of the surface (9) of the rail (4), and may be an apparatus configured for use on a tower crane (1) having one or more of the attributes, characteristics, or functionality described herein. Such configuration may involve providing the apparatus separately from the tower crane (1), but having the capability to be installed or otherwise used on or with the tower crane (1) as or substantially as provided.

In some embodiments, the apparatus may be provided directly on or with or otherwise may form a piece, part, or component of the tower crane (1) itself, for example by being installed on or integrated into the tower crane (1) at a point of manufacture.

In some embodiments, a tower crane boom rail heat application apparatus (5) may include a tower crane boom (3) having a length (7), a trolley (6) configured for movement along at least a portion of the length (7) of the tower crane boom (3), a tower crane boom rail (4) disposed along the portion of the length of the tower crane boom (3) upon which or with which the trolley (6) moves for movement along the portion of the length (7) of the tower crane boom (3), at least one movement element (8) of the trolley (6) configured to use a surface (9) of the tower crane boom rail (4) for movement along the portion of the length (7) of the tower crane boom (3), an unobstructed movement element travel space (10) of the surface (9) of the tower crane boom rail (4) through which the movement element (8) of the trolley (6) is configured to move, an available remainder space (11) of the surface (9) of the tower crane boom rail (4) exclusive of the unobstructed movement element travel space (10), a heat source (13) configured to apply heat to the unobstructed movement element travel space (10) of the surface (9) of the tower crane boom rail (4), and a space available mount (12) of the heat source (13) configured to occupy only the available remainder space (11) of the surface (9) of the tower crane boom rail (4).

Various embodiments may involve a tower crane structural member heating apparatus comprising a structural member (26) of a tower crane (1) and a heating wire (19) configured to apply heat to the structural member (26). A structural member (26) may be any part, piece, or component of a tower crane (1), and in various embodiments may be subject to the specialized or particularized needs of tower cranes (1) as may be described elsewhere herein. Embodiments accordingly may involve a method for melting snow or ice from a structural member of a tower crane comprising the steps of utilizing a heating wire (19) secured to a structural member (26) of a tower crane (1), applying heat from the heating wire (19) to the structural member (26) of the tower crane (1), and melting snow or ice on the structural member (26) of the tower crane (1) with the applied heat.

While the disclosure herein has described certain manners of use for heating wires (19) and wire assemblies (18), it should be understood that the use for such heating wires (19) may be any as consistent with the disclosure herein, analogous to the disclosure herein, and that does not otherwise contradict the disclosure herein, and in various embodiments may include use of heating wires (19) and/or wire assemblies (18) on any part, piece, or component of a tower crane (1) including on the outside thereof, on the inside thereof (such as disposed within a hollow tube, hollow member, or the like), in direct contact thereof, spaced therefrom, coiled thereof, wrapped thereof, and the like.

The disclosure herein may include descriptions of embodiments of the inventive technology applicable to tower cranes (1). While the inventive technology may have particular applicability to tower cranes (1), it should be understood that the scope of the inventive technology applies to and encompasses use of the inventive technology on or in connection with any kind of crane. Examples may be seen in FIG. 1. In particular, the disclosure and claims herein should be understood to support disclosure of and claims directed to every description and claim utilizing the words "tower crane" and substituting instead the word "crane."

The term join as used herein should be interpreted to be non-limiting, as for example where it may be used to describe two things that are connected without limitation as to the manner of connection.

Figure 15:
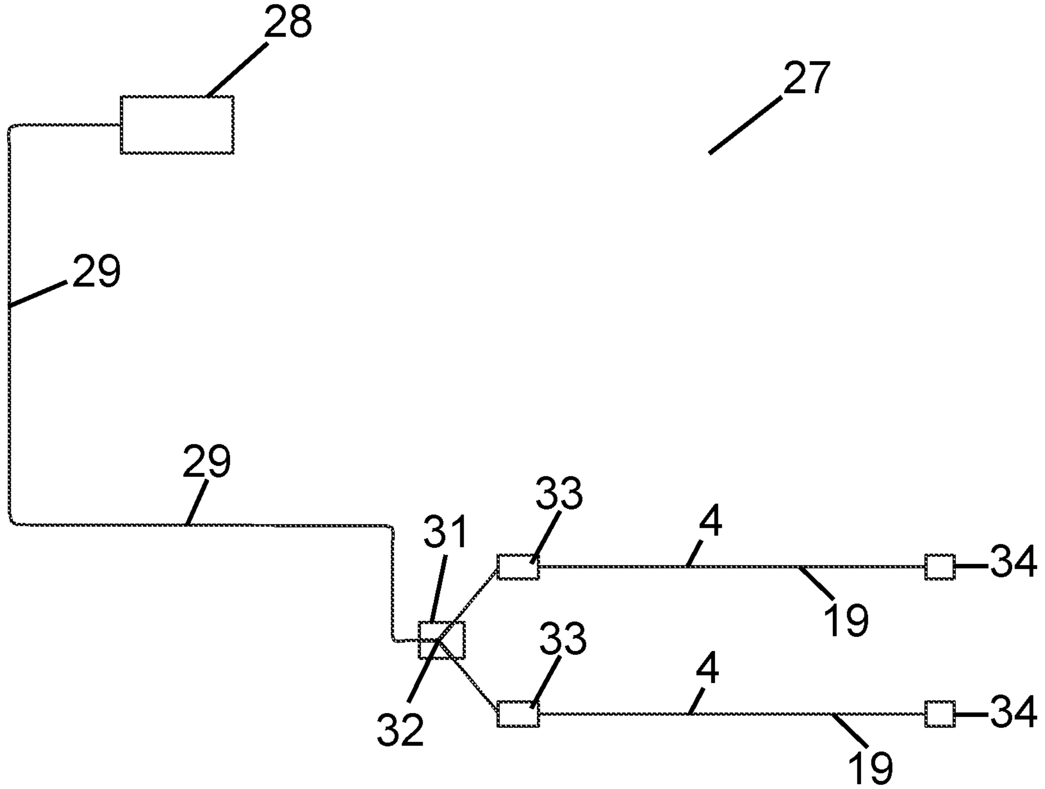
FIG. 15 shows a non-limiting example of a power system for a tower crane boom rail heating apparatus in a first exemplary embodiment.

With reference to FIG. 15, a power system (27) for a tower crane boom rail heating apparatus (5) may be shown in a first exemplary embodiment. The power system (27) may use the main power source (28) from a tower crane (1) to operate the heat source (13), which in various embodiments may be a heating wire (19). As a result, there may be no stand-alone heating units that may need to be contended with by the crane operator to provide the required heat. It may be noted the embodiment shown in FIG. 15 is exemplary only, and does not limit the scope, kinds, configurations, or manners of use by which power systems may be used with the tower crane boom rail heat application apparatus (5) described herein. With respect to the embodiment disclosed by FIG. 15, the tower crane boom rail heat application apparatus (5) may use a power conduit (29), such as a 277v-3 wire cord, a 480v-3 wire cord, or the like. The power conduit (29) may go to a power conduit connector (31), such as a junction box, and may include a power conduit T (32), such as a "Y" split, for example a JHT-GET, to one or more tower crane boom rails (4). The power conduit (29) may be run through a power conduct splice (33), such as a JHS-GET. The power conduit (29) may have end seals (34), such as dummy plugs, for example JHE-GETs, for example to end the power conduit (29) or to add more sections of the power conduit (29) to one or more tower crane boom rails (4). In some embodiments, the tower crane boom rail heat application apparatus (5) may have a minimum of two forms of protection to prevent the apparatus from overheating.

Figure 16:
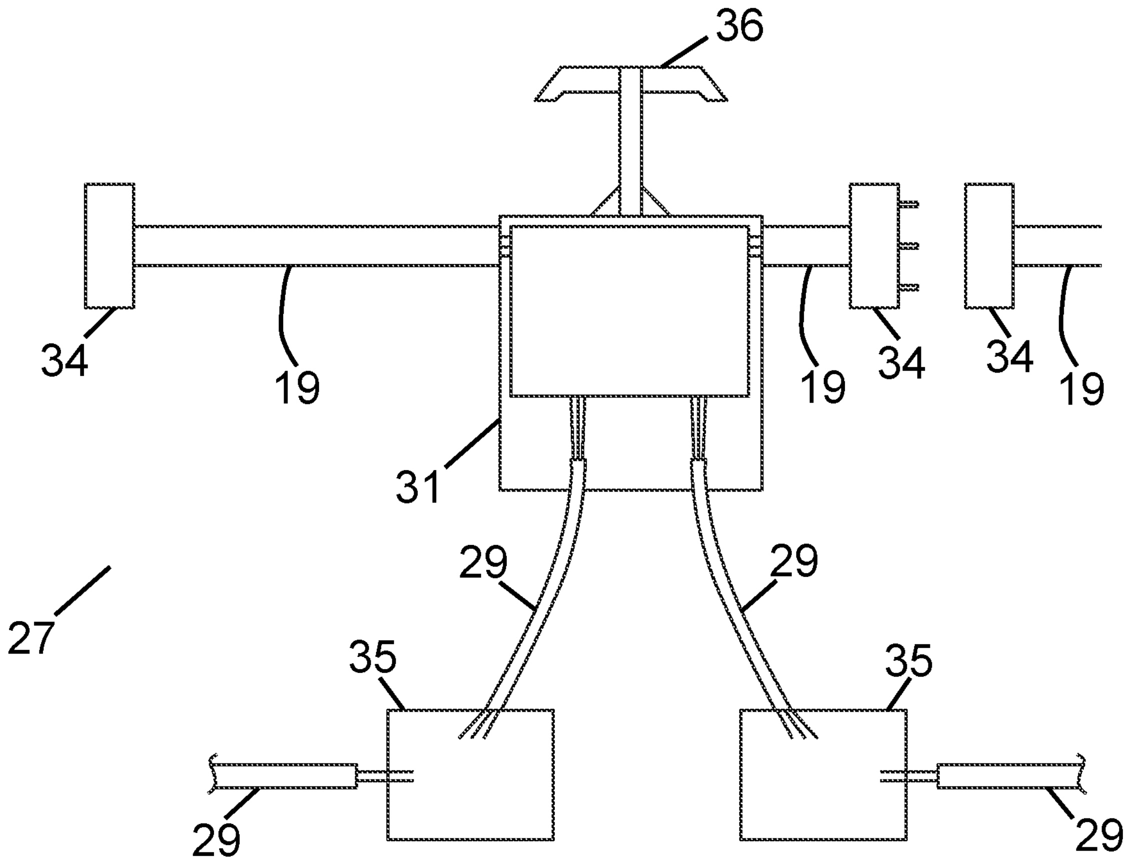
FIG. 16 shows a non-limiting example of a power system for a tower crane boom rail heating apparatus in a second exemplary embodiment.

With reference to FIG. 16, a power system (27) for a tower crane boom rail heating apparatus (5) may be shown in a second exemplary embodiment. The power system (27) may use the main power source (28) from a tower crane (1) to operate the heat source (13), which in various embodiments may be a heating wire (19). As a result, there may be no stand-alone heating units that may need to be contended with by the crane operator to provide the required heat. It may be noted the embodiment shown in FIG. 16 is exemplary only, and does not limit the scope, kinds, configurations, or manners of use by which power systems may be used with the tower crane boom rail heat application apparatus (5) described herein. With respect to the embodiment disclosed by FIG. 16, the tower crane boom rail heat application apparatus (5) may use one or more power conduits (29), such as a 480v-3 wire cord or the like. The power conduit or conduits (29) may go to one or more thermostats (35), which may include those as described elsewhere herein. The power conduit or conduits (29) may go to a power conduit controller (31), such as a junction box or the like. The power conduit controller (31) may route power from the power conduit or conduits (29) to one or more heating wires (19), which may be disposed along a tower crane boom rail (4) or other part, piece, or component of a tower crane (1). The heating wire or wires (19) may terminate at an end seal or end seals (34), which may serve to terminate a length of heating wire (19) or may serve to permit the connection of sections of heating wire (19), such as wherein one or more end seals (34) may be configured as male or female connections or the like. The power system (27) further may have or utilize a support (36) for joining the power system (27) to one or more parts, pieces, or components of a tower crane (1) in a suitable matter consistent with the disclosure provided herein.

While the present inventive technology has been described in connection with some preferred embodiments, it is not intended to limit the scope of the inventive technology to the particular form set forth, but on the contrary, it is intended to cover such alternatives, modifications, and equivalents, as may be included within the spirit and scope of the inventive technology as defined by the statements of inventions. Examples of alternative claims may include:

1. A tower crane boom rail heat application apparatus comprising:
   - an apparatus configured for use on a tower crane, said tower crane comprising:
     - a tower crane boom having a length;
     - a trolley configured for movement along at least a portion of said length of said tower crane boom;
     - a tower crane boom rail disposed along said portion of said length of said tower crane boom with which said trolley moves for said movement along said portion of said length of said tower crane boom;
     - at least one movement element of said trolley configured to use a surface of said tower crane boom rail for said movement along said portion of said length of said tower crane boom;
     - an unobstructed movement element travel space of said surface of said tower crane boom rail through which said movement element of said trolley is configured to move;
     - an available remainder space of said surface of said tower crane boom rail exclusive of said unobstructed movement element travel space;
   - and said apparatus comprising:
     - a heat source configured to apply heat to said unobstructed movement element travel space of said surface of said tower crane boom rail;
     - a space available mount of said heat source configured to occupy only said available remainder space of said surface of said tower crane boom rail.
2. A tower crane boom rail heat application apparatus as described in clause 1 or any other clause wherein said tower crane boom rail comprises a rectangular tube.
3. A tower crane boom rail heat application apparatus as described in clause 2 or any other clause wherein said rectangular tube comprises an approximately 5 inch by approximately 5 inch rectangular tube.
4. A tower crane boom rail heat application apparatus as described in clause 2 or any other clause wherein said rectangular tube comprises a rectangular tube having one side having a width from 2 inches wide to 10 inches wide.
5. A tower crane boom rail heat application apparatus as described in clause 1 or any other clause wherein said surface of said tower crane boom rail comprises a flat surface portion of said tower crane boom rail, wherein said movement element of said trolley comprises a roller, wherein said unobstructed movement element travel space comprises a roller path of said flat surface portion, and wherein said available remainder space comprises an available remainder space of said flat surface portion.
6. A tower crane boom rail heat application apparatus as described in clause 5 or any other clause wherein said flat surface portion has a width of approximately 5 inches, wherein said roller has a width of approximately 2 inches, wherein said roller path has a width of approximately 2 inches, and wherein said available remainder space of said flat surface portion has a width of approximately 3 inches.

7. A tower crane boom rail heat application apparatus as described in clause 6 or any other clause further comprising a lace footprint space occupying said flat surface portion exclusive of said roller path and having a clearance not exceeding approximately 0.5 inches within said available remainder space.

8. A tower crane boom rail heat application apparatus as described in clause 1 or any other clause wherein said heat source comprises an elongate uniform distribution heat source.

9. A tower crane boom rail heat application apparatus as described in clause 1 or any other clause wherein said heat source comprises a rail symmetric heat source.

10. A tower crane boom rail heat application apparatus as described in clause 1 or any other clause wherein said heat source comprises a heat source selected from the group consisting of sufficient to melt snow from said unobstructed movement element travel space and sufficient to melt ice from said unobstructed movement element travel space.

11. A tower crane boom rail heat application apparatus as described in clause 1 or any other clause wherein said heat source comprises a heating wire.

12. A tower crane boom rail heat application apparatus as described in clause 11 or any other clause wherein said heating wire has a diameter not exceeding approximately 0.24 inches.

13. A tower crane boom rail heat application apparatus as described in clause 1 or any other clause wherein said available remainder space comprises a substantially smooth surface.

14. A tower crane boom rail heat application apparatus as described in clause 1 or any other clause wherein said available remainder space comprises an available remainder space lacking clamp sites.

15. A tower crane boom rail heat application apparatus as described in clause 1 or any other clause wherein said available remainder space comprises an available remainder space without any openings.

16. A tower crane boom rail heat application apparatus as described in clause 1 or any other clause wherein said available remainder space comprises an uncompromisable structure.

17. A tower crane boom rail heat application apparatus as described in clause 16 or any other clause wherein said uncompromisable structure comprises an uncompromisable structure selected from the group consisting of a weld prohibited structure and a drill prohibited structure.

18. A tower crane boom rail heat application apparatus as described in clause 1 or any other clause wherein said available remainder space comprises a lace footprint restricted available remainder space.

19. A tower crane boom rail heat application apparatus as described in clause 1 or any other clause wherein said space available mount comprises a space available mount configured not to impede said movement of said trolley along said portion of said length of said tower crane boom.

20. A tower crane boom rail heat application apparatus as described in clause 1 or any other clause wherein said space available mount comprises a space available mount configured not to impede said unobstructed movement element travel space.

21. A tower crane boom rail heat application apparatus as described in clause 1 or any other clause wherein said space available mount comprises a mount joined to a substantially smooth surface of said available remainder space.

22. A tower crane boom rail heat application apparatus as described in clause 1 or any other clause wherein said space available mount comprises a space available mount joined to a surface of said available remainder space in direct contact.

23. A tower crane boom rail heat application apparatus as described in clause 22 or any other clause wherein said space available mount joined to a surface of said available remainder space in direct contact comprises a space available mount joined to said surface of said available remainder space with adhesive.

24. A tower crane boom rail heat application apparatus as described in clause 1 or any other clause wherein said space available mount comprises a space available mount configured not to use a clamp.

25. A tower crane boom rail heat application apparatus as described in clause 1 or any other clause wherein said space available mount comprises a space available mount configured not to use an opening of said available remainder space.

26. A tower crane boom rail heat application apparatus as described in clause 1 or any other clause wherein said space available mount comprises a space available mount configured not to compromise a structure of said available remainder space.

27. A tower crane boom rail heat application apparatus as described in clause 1 or any other clause wherein said space available mount comprises a space available mount configured not to use a drilled structure.

28. A tower crane boom rail heat application apparatus as described in clause 1 or any other clause wherein said space available mount comprises a space available mount configured not to use a weld.

29. A tower crane boom rail heat application apparatus as described in clause 1 or any other clause wherein said space available mount comprises a space available mount configured not to impede inspection of a lace.

30. A tower crane boom rail heat application apparatus as described in clause 1 or any other clause wherein said space available mount comprises a wire assembly having a heating wire disposed within a channel.

31. A tower crane boom rail heat application apparatus as described in clause 30 or any other clause wherein said channel has a width not exceeding approximately 0.625 inches.

32. A tower crane boom rail heat application apparatus as described in clause 30 or any other clause wherein said heating wire has a width not exceeding approximately 0.24 inches.

33. A tower crane boom rail heat application apparatus as described in clause 30 or any other clause further comprising a fill material between said channel and said heating wire.

34. A tower crane boom rail heat application apparatus as described in clause 33 or any other clause wherein said fill material comprises a heat conduction fill material.

35. A tower crane boom rail heat application apparatus as described in clause 33 or any other clause wherein said fill material comprises an insulation fill material.

36. A tower crane boom rail heat application apparatus as described in clause 33 or any other clause wherein said fill material comprises a heating wire stabilization fill material.
37. A tower crane boom rail heat application apparatus as described in clause 33 or any other clause wherein said fill material comprises a fluid fill material.
38. A tower crane boom rail heat application apparatus as described in clause 37 or any other clause wherein said fluid fill material comprises a silicone sealant.
39. A tower crane boom rail heat application apparatus as described in clause 37 or any other clause wherein said wire assembly further comprises at least one wire strap having at least a portion disposed against said heating wire, at least one channel strap having at least a portion disposed against said channel, and wherein said fluid fill material fills the remaining space within said channel.
40. A tower crane boom rail heat application apparatus as described in clause 39 or any other clause wherein at least one said channel strap having at least a portion disposed against said channel comprises at least one said channel strap having at least a portion welded to said channel.
41. A tower crane boom rail heat application apparatus as described in clause 39 or any other clause wherein at least one said channel strap and at least one said wire strap comprise adjacent strap pairs.
42. A tower crane boom rail heat application apparatus as described in clause 39 or any other clause wherein said channel comprises a rectangular channel and each said strap comprises a rounded strap.
43. A tower crane boom rail heat application apparatus as described in clause 39 or any other clause wherein at least one said strap further comprises a tab extending beyond said channel.
44. A tower crane boom rail heat application apparatus as described in clause 43 or any other clause wherein each said tab extends up to 0.5 inches beyond said channel.
45. A tower crane boom rail heat application apparatus as described in clause 43 or any other clause wherein each said tab comprises a tab joined to a surface of said available remainder space with adhesive.
46. A tower crane boom rail heat application apparatus as described in clause 33 or any other clause wherein said channel, said heating wire, and said fill material form a base of said wire assembly, and further comprising at least a portion of said base of said wire assembly joined to a surface of said available remainder space with adhesive.
47. A tower crane boom rail heat application apparatus as described in clause 31 or any other clause further comprising a plurality of said wire assemblies disposed within said available remainder space between a plurality of lace footprint spaces of said tower crane boom rail.
48. A tower crane boom rail heat application apparatus as described in clause 47 or any other clause wherein at least one said wire assembly comprises a length of approximately 68 inches.
49. A tower crane boom rail heat application apparatus as described in clause 47 or any other clause wherein at least one said wire assembly comprises a length of approximately 53 inches.
50. A tower crane boom rail heat application apparatus as described in clause 47 or any other clause further comprising at least one exposed heating wire section within said available remainder space connecting at least two said wire assemblies and clearing at least one said lace footprint space.
51. A tower crane boom rail heat application apparatus as described in clause 50 or any other clause wherein said clearance around said at least one lace footprint space within said available remainder space through which said at least one exposed wire section is routed does not exceed 0.5 inches.
52. A tower crane boom rail heat application apparatus comprising:
  - a tower crane boom having a length;
  - a trolley configured for movement along at least a portion of said length of said tower crane boom;
  - a tower crane boom rail disposed along said portion of said length of said tower crane boom with which said trolley moves for said movement along said portion of said length of said tower crane boom;
  - at least one movement element of said trolley configured to use a surface of said tower crane boom rail for said movement along said portion of said length of said tower crane boom;
  - an unobstructed movement element travel space of said surface of said tower crane boom rail through which said movement element of said trolley is configured to move;
  - an available remainder space of said surface of said tower crane boom rail exclusive of said unobstructed movement element travel space;
  - a heat source configured to apply heat to said unobstructed movement element travel space of said surface of said tower crane boom rail;
  - a space available mount of said heat source configured to occupy only said available remainder space of said surface of said tower crane boom rail.
53. A tower crane structural member heating apparatus comprising:
  - a structural member of a tower crane; and
  - a heating wire configured to heat said structural member of said tower crane.
54. A method for melting snow or ice on a rail of a boom of a tower crane comprising the steps of:
  - utilizing a space available mount of a heat source to secure said heat source in the available remainder space of a surface of a tower crane boom rail exclusive of an unobstructed movement element travel space of said surface of said tower crane boom rail;
  - applying heat with said heat source to said unobstructed movement element travel space of said surface of said tower crane boom rail;
  - melting snow or ice in said unobstructed movement element travel space of said surface of said tower crane boom rail as a result of said step of applying heat;
  - permitting movement of at least one movement element of a trolley through said unobstructed movement element travel space of said surface of said tower crane boom rail as a result of said step of melting;
  - moving said trolley on said tower crane boom rail disposed along at least a portion of a length of a tower crane boom by using said surface of said tower crane boom rail to move said at least one movement element of said trolley through said unobstructed movement element travel space of said surface of said tower crane boom rail.

55. A method for melting snow or ice on a rail of a boom of a tower crane as described in clause 54 or any other clause wherein said tower crane boom rail comprises a rectangular tube.
56. A method for melting snow or ice on a rail of a boom of a tower crane as described in clause 55 or any other clause wherein said rectangular tube comprises an approximately 5 inch by approximately 5 inch rectangular tube.
57. A method for melting snow or ice on a rail of a boom of a tower crane as described in clause 55 or any other clause wherein said rectangular tube comprises a rectangular tube having one side having a width from 2 inches wide to 10 inches wide.
58. A method for melting snow or ice on a rail of a boom of a tower crane as described in clause 54 or any other clause wherein said surface of said tower crane boom rail comprises a flat surface portion of said tower crane boom rail, wherein said movement element of said trolley comprises a roller, wherein said unobstructed movement element travel space comprises a roller path of said flat surface portion, and wherein said available remainder space comprises an available remainder space of said flat surface portion.
59. A method for melting snow or ice on a rail of a boom of a tower crane as described in clause 58 or any other clause wherein said flat surface portion has a width of approximately 5 inches, wherein said roller has a width of approximately 2 inches, wherein said roller path has a width of approximately 2 inches, and wherein said available remainder space of said flat surface portion has a width of approximately 3 inches.
60. A method for melting snow or ice on a rail of a boom of a tower crane as described in clause 59 or any other clause further comprising a lace footprint space occupying said flat surface portion exclusive of said roller path and having a clearance not exceeding approximately 0.5 inches within said available remainder space.
61. A method for melting snow or ice on a rail of a boom of a tower crane as described in clause 54 or any other clause wherein said step of applying heat comprises the step of uniformly elongately distributing said heat applied with said heat source.
62. A method for melting snow or ice on a rail of a boom of a tower crane as described in clause 54 or any other clause wherein said step of applying heat comprises the step of symmetrically applying said heat with said heat source to said tower crane boom rail.
63. A method for melting snow or ice on a rail of a boom of a tower crane as described in clause 54 or any other clause wherein said step of applying heat comprises the step of applying heat with a heating wire.
64. A method for melting snow or ice on a rail of a boom of a tower crane as described in clause 63 or any other clause wherein said step of applying heat with a heating wire comprises the step of applying heat with a heating wire having a diameter not exceeding approximately 0.24 inches.
65. A method for melting snow or ice on a rail of a boom of a tower crane as described in clause 54 or any other clause wherein said available remainder space comprises a substantially smooth surface.
66. A method for melting snow or ice on a rail of a boom of a tower crane as described in clause 54 or any other clause wherein said available remainder space comprises an available remainder space lacking clamp sites.
67. A method for melting snow or ice on a rail of a boom of a tower crane as described in clause 54 or any other clause wherein said available remainder space comprises an available remainder space without any openings.
68. A method for melting snow or ice on a rail of a boom of a tower crane as described in clause 54 or any other clause wherein said available remainder space comprises an uncompromisable structure.
69. A method for melting snow or ice on a rail of a boom of a tower crane as described in clause 68 or any other clause wherein said uncompromisable structure comprises an uncompromisable structure selected from the group consisting of a weld prohibited structure and a drill prohibited structure.
70. A method for melting snow or ice on a rail of a boom of a tower crane as described in clause 54 or any other clause further comprising the step of restricting said available remainder space with a lace footprint.
71. A method for melting snow or ice on a rail of a boom of a tower crane as described in clause 54 or any other clause further comprising the step of not impeding said movement of said trolley on said tower crane boom rail with said space available mount.
72. A method for melting snow or ice on a rail of a boom of a tower crane as described in clause 54 or any other clause further comprising the step of not impeding said movement of said at least one movement element of said trolley through said unobstructed movement element travel space with said space available mount.
73. A method for melting snow or ice on a rail of a boom of a tower crane as described in clause 54 or any other clause wherein said step of utilizing comprises the step of utilizing said space available mount of said heat source to secure said heat source to a substantially smooth surface of said available remainder space.
74. A method for melting snow or ice on a rail of a boom of a tower crane as described in clause 54 or any other clause wherein said step of utilizing comprises the step of directly contacting said space available mount to a surface of said available remainder space.
75. A method for melting snow or ice on a rail of a boom of a tower crane as described in clause 74 or any other clause wherein said step of directly contacting comprises the step of adhering said space available mount to a surface of said available remainder space.
76. A method for melting snow or ice on a rail of a boom of a tower crane as described in clause 54 or any other clause wherein said step of utilizing comprises the step of not clamping said heat source to said available remainder space.
77. A method for melting snow or ice on a rail of a boom of a tower crane as described in clause 54 or any other clause wherein said step of utilizing comprises the step of not using an opening of said available remainder space.
78. A method for melting snow or ice on a rail of a boom of a tower crane as described in clause 54 or any other clause wherein said step of utilizing comprises the step of not compromising a structure of said available remainder space.
79. A method for melting snow or ice on a rail of a boom of a tower crane as described in clause 54 or any other clause wherein said step of not compromising a structure comprises the step of not drilling said available remainder space.

80. A method for melting snow or ice on a rail of a boom of a tower crane as described in clause 54 or any other clause wherein said step of not compromising a structure comprises the step of not welding said available remainder space.
81. A method for melting snow or ice on a rail of a boom of a tower crane as described in clause 54 or any other clause further comprising the step of not impeding an inspection of a lace with said space available mount.
82. A method for melting snow or ice on a rail of a boom of a tower crane as described in clause 54 or any other clause wherein said step of applying heat with said heat source comprises the step of applying heat with a heating wire disposed within a channel of a wire assembly.
83. A method for melting snow or ice on a rail of a boom of a tower crane as described in clause 82 or any other clause wherein said channel has a width not exceeding approximately 0.625 inches.
84. A method for melting snow or ice on a rail of a boom of a tower crane as described in clause 82 or any other clause wherein said heating wire has a width not exceeding approximately 0.24 inches.
85. A method for melting snow or ice on a rail of a boom of a tower crane as described in clause 82 or any other clause wherein said step of applying heat with said heat source comprises the step of applying heat with a heating wire disposed within a channel of a wire assembly having a fill material between said channel and said heating wire.
86. A method for melting snow or ice on a rail of a boom of a tower crane as described in clause 85 or any other clause wherein said step of applying heat comprises the step of conducting said heat with said fill material.
87. A method for melting snow or ice on a rail of a boom of a tower crane as described in clause 85 or any other clause wherein said step of applying heat comprises the step of insulating said heating wire with said fill material.
88. A method for melting snow or ice on a rail of a boom of a tower crane as described in clause 85 or any other clause wherein said step of applying heat comprises the step of stabilizing said heating wire with said fill material.
89. A method for melting snow or ice on a rail of a boom of a tower crane as described in clause 85 or any other clause wherein said step of applying heat with said heat source comprises the step of applying heat with a heating wire disposed within a channel of a wire assembly having a fluid fill material between said channel and said heating wire.
90. A method for melting snow or ice on a rail of a boom of a tower crane as described in clause 89 or any other clause wherein said step of applying heat with said heat source comprises the step of applying heat with a heating wire disposed within a channel of a wire assembly having a silicone sealant between said channel and said heating wire.
91. A method for melting snow or ice on a rail of a boom of a tower crane as described in clause 89 or any other clause wherein said step of applying heat with said heat source comprises the step of applying heat with a heating wire disposed within a channel of a wire assembly having a fluid fill material between said channel and said heating wire, at least one wire strap having at least a portion disposed against said heating wire, at least one channel strap having at least a portion disposed against said channel, and wherein said fluid fill material fills the remaining space within said channel.
92. A method for melting snow or ice on a rail of a boom of a tower crane as described in clause 91 or any other clause wherein at least one said channel strap having at least a portion disposed against said channel comprises a channel strap having at least a portion welded to said channel.
93. A method for melting snow or ice on a rail of a boom of a tower crane as described in clause 91 or any other clause wherein at least one said channel strap and at least one said wire strap comprise adjacent strap pairs.
94. A method for melting snow or ice on a rail of a boom of a tower crane as described in clause 91 or any other clause wherein said channel comprises a rectangular channel and each said strap comprises a rounded strap.
95. A method for melting snow or ice on a rail of a boom of a tower crane as described in clause 91 wherein at least one said strap further comprises a tab extending beyond said channel.
96. A method for melting snow or ice on a rail of a boom of a tower crane as described in clause 95 or any other clause wherein each said tab extends up to 0.5 inches beyond said channel.
97. A method for melting snow or ice on a rail of a boom of a tower crane as described in clause 95 or any other clause wherein each said tab comprises a tab joined to a surface of said available remainder space with adhesive.
98. A method for melting snow or ice on a rail of a boom of a tower crane as described in clause 85 or any other clause wherein said channel, said heating wire, and said fill material form a base of said wire assembly, and further comprising at least a portion of said base of said wire assembly joined to a surface of said available remainder space with adhesive.
99. A method for melting snow or ice on a rail of a boom of a tower crane as described in clause 83 or any other clause wherein said step of applying heat with said heat source comprises the step of applying heat with a plurality of said wire assemblies disposed within said available remainder space between a plurality of lace footprint spaces of said tower crane boom rail.
100. A method for melting snow or ice on a rail of a boom of a tower crane as described in clause 99 or any other clause wherein at least one said wire assembly comprises a length of approximately 68 inches.
101. A method for melting snow or ice on a rail of a boom of a tower crane as described in clause 99 or any other clause wherein at least one said wire assembly comprises a length of approximately 53 inches.
102. A method for melting snow or ice on a rail of a boom of a tower crane as described in clause 99 or any other clause wherein said step of applying heat with said heat source comprises the step of applying heat with at least one exposed heating wire section within said available remainder space connecting at least two said wire assemblies and clearing at least one said lace footprint space.
103. A method for melting snow or ice on a rail of a boom of a tower crane as described in clause 102 or any other clause wherein said step of applying heat with said heat source comprises the step of clearing said at least one said lace footprint space within said available remainder space with a clearance not exceeding 0.5 inches through which said exposed heating wire section is routed.

104. A method for melting snow or ice from a structural member of a tower crane comprising the steps of:
utilizing a heating wire secured to a structural member of a tower crane;
applying heat from said heating wire to said structural member of said tower crane; and
melting snow or ice on said structural member of said tower crane with said applied heat.

105. A system substantially as herein described with reference to any one or more of the Figures and Description.

106. The process according to clause 54 and clause 104 or any other clause and further comprising any of the steps as shown in any of the Figures, separately, in any combination or permutation.

As can be easily understood from the foregoing, the basic concepts of the various embodiments of the present inventive technology(ies) may be embodied in a variety of ways. It involves both deicing techniques as well as devices to accomplish the appropriate deicing. In this application, the deicing techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this patent application is intended to serve as a basic description. The reader should be aware that the specific discussion may not explicitly describe all embodiments possible; many alternatives are implicit. It also may not fully explain the generic nature of the various embodiments of the inventive technology(ies) and may not explicitly show how each feature or element can actually be representative of a broader function or of a great variety of alternative or equivalent elements. As one example, terms of degree, terms of approximation, and/or relative terms may be used. These may include terms such as the words: approximately, substantially, about, only, and the like. These words and types of words are to be understood in a dictionary sense as terms that encompass an ample or considerable amount, quantity, size, etc. as well as terms that encompass largely but not wholly that which is specified. Further, for this application if or when used, terms of degree, terms of approximation, and/or relative terms should be understood as also encompassing more precise and even quantitative values that include various levels of precision and the possibility of claims that address a number of quantitative options and alternatives. For example, to the extent ultimately used, the existence or non-existence of a substance or condition in a particular input, output, or at a particular stage can be specified as substantially only x or substantially free of x, as a value of about x, or such other similar language. Using percentage values as one example, these types of terms should be understood as encompassing the options of percentage values that include 99.5%, 99%, 97%, 95%, 92% or even 90% of the specified value or relative condition; correspondingly for values at the other end of the spectrum (e.g., substantially free of x, these should be understood as encompassing the options of percentage values that include not more than 0.5%, 1%, 3%, 5%, 8% or even 10% of the specified value or relative condition, all whether by volume or by weight as either may be specified). In context, these should be understood by a person of ordinary skill as being disclosed and included whether in an absolute value sense or in valuing one set of or substance as compared to the value of a second set of or substance. Again, these are implicitly included in this disclosure and should (and, it is believed, would) be understood to a person of ordinary skill in this field. Where the application is described in device-oriented terminology, each element of the device implicitly performs a function. Apparatus claims may not only be included for the device described, but also method or process claims may be included to address the functions of the embodiments and that each element performs. Neither the description nor the terminology is intended to limit the scope of the claims that will be included in any subsequent patent application.

It should also be understood that a variety of changes may be made without departing from the essence of the various embodiments of the inventive technology(ies). Such changes are also implicitly included in the description. They still fall within the scope of the various embodiments of the inventive technology(ies). A broad disclosure encompassing the explicit embodiment(s) shown, the great variety of implicit alternative embodiments, and the broad methods or processes and the like are encompassed by this disclosure and may be relied upon when drafting the claims for any subsequent patent application. It should be understood that such language changes and broader or more detailed claiming may be accomplished at a later date (such as by any required deadline) or in the event the applicant subsequently seeks a patent filing based on this filing. With this understanding, the reader should be aware that this disclosure is to be understood to support any subsequently filed patent application that may seek examination of as broad a base of claims as deemed within the applicant's right and may be designed to yield a patent covering numerous aspects of embodiments of the inventive technology(ies) both independently and as an overall system.

Further, each of the various elements of the embodiments of the inventive technology(ies) and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the various embodiments of the inventive technology(ies), the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which embodiments of the inventive technology(ies) is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "heat source" should be understood to encompass disclosure of the act of "heating"—whether explicitly discussed or not—and, conversely, were there effectively disclosure of the act of "heating", such a disclosure should be understood to encompass disclosure of a "heat source" and even a "means for heating." Such changes and alternative terms are to be understood to be explicitly included in the description. Further, each such means (whether explicitly so described or not) should be understood as encompassing all elements that can perform the given function, and all descriptions of elements that perform a described function should be understood as a non-limiting example of means for performing that function. As other non-limiting examples, it should be understood that claim elements can also be expressed as any of: components, programming, subroutines, logic, or elements that are configured to, or configured and arranged to, provide or even achieve a particular result, use, purpose, situation, function, or operation, or as components that are capable of achieving a particular activity, result, use, purpose, situation, function, or operation. All should be understood as within the scope of this disclosure and written description.

Any patents, publications, or other references mentioned in this application for patent are hereby incorporated by reference. Any priority case(s) claimed by this application is hereby appended and hereby incorporated by reference. In addition, as to each term used it should be understood that unless its utilization in this application is inconsistent with a broadly supporting interpretation, common dictionary definitions should be understood as incorporated for each term and all definitions, alternative terms, and synonyms such as contained in the Random House Webster's Unabridged Dictionary, second edition are hereby incorporated by reference. Finally, all references listed in the List of References below or other information statement filed with the application are hereby appended and hereby incorporated by reference, however, as to each of the above, to the extent that such information or statements incorporated by reference might be considered inconsistent with the patenting of the various embodiments of inventive technology(ies) such statements are expressly not to be considered as made by the applicant(s).

LIST OF REFERENCES
US PATENTS

| Patent No. | Kind Code | Date Issued | Patentee |
|---|---|---|---|
| 9568137 | B2 | 2017 Feb. 14 | Heise et al. |
| 10361551 | B2 | 2019 Jul. 23 | Heise |
| 6147308 | | 2000 Nov. 14 | Santagata |
| 4388523 | | 1983 Jun. 14 | Keep, Jr. et al. |
| 6943319 | B2 | 2005 Sep. 13 | Jones |
| 4391425 | | 1983 Jul. 05 | Keep, Jr. |
| 5941482 | | 1999 Aug. 24 | Santagata |
| 3648017 | | 1972 Mar. 07 | Obata |
| 3894635 | | 1975 Jul. 15 | Reich |
| 5203072 | | 1993 Apr. 20 | Boisture |
| 6102333 | | 2000 Aug. 15 | Gerardi et al. |
| 6547187 | | 2003 Apr. 15 | Foster |
| 6854562 | | 2005 Feb. 15 | Kwak |
| 8820683 | | 2014 Sep. 02 | Stonestreet II et al. |
| 8857635 | | 2014 Oct. 14 | Weckbecker et al. |

US PUBLICATIONS

| Publication No. | Kind Code | Date Published | Patentee |
|---|---|---|---|
| 20160258124 | A1 | 2016 Sep. 08 | Johnston |
| 20190010670 | A1 | 2019 Jan. 10 | Falldin |

-continued

US PUBLICATIONS

| Publication No. | Kind Code | Date Published | Patentee |
|---|---|---|---|
| 20090072091 | A1 | 2009 Mar. 19 | Al-Khalil |
| 20100243811 | A1 | 2010 Sep. 30 | Stothers |

NON PATENT LITERATURE

Prime Wire & Cable PHC42W06 6ft. Pipe HEATING Cable, https://www.google.com/shopping/product/8689991952794886089?q=c, accessed Nov. 3, 2022

Easyheat 2502 Freeze Free HEATING Cable 500' https://www.google.com/shopping/product/14200051247487970790?q, accessed Nov. 3, 2022

Ritche Cable Heater Cable Heater | Thiesen's Home & Auto https://www.theisens.com/products/cable-heater/109080086/?gclid=EA, accessed Nov. 3, 2022

About Us-Thermal Flex Systems, https: // tflexsys.com/about-us/. Accessed Nov. 3, 2022

Crane Rail Heating-Thermal Flex Systems, https://tflexsys.com/crane-rail-heating-2/, accessed Nov. 3, 2022

Crane Rail Heating Cable-Thermal Flex Systems, https://tflexsys.com/crane-rail-heating-2/crane-rail-heating-cable/, Nov. 3, 2022

Crane Rail Heating Controls-Thermal Flex Systems, https://tflexsys.com/crane-rail-heating-2/crane-rail-heating-controls/, Accessed Nov. 4, 2022

Factory Crane Rail Heating-Thermal Flex Systems, https://tflexsys.com/crane-rail-heating-2/factory-crane-rail-heating/, Accessed Nov. 4, 2022

Outdoor Crane Rail Heating, https://tflexsys.com/crane-rail-heating-2/outdoor-crane-rail-heating/, Accessed Nov. 4, 2022

United States Provisional Patent Application No. 63/285,409 filed Dec. 2, 2021. First named inventor: Kluver.

Thus, the applicant(s) should be understood to have support to claim and make claims to embodiments including at least: i) each of the deicing devices as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such processes, methods, systems or components, ix) each system, method, and element shown or described as now applied to any specific field or devices mentioned, x) methods and apparatuses substantially as described hereinbefore and with reference to any of the accompanying examples, xi) an apparatus for performing the methods described herein comprising means for performing the steps, xii) the various combinations and permutations of each of the elements disclosed, xiii) each potentially dependent claim or concept as a dependency on each and every one of the independent claims or concepts presented, and xiv) all inventions described herein.

With regard to claims whether now or later presented for examination, it should be understood that for practical reasons and so as to avoid great expansion of the examination burden, the applicant may at any time present only initial claims or perhaps only initial claims with only initial dependencies. The office and any third persons interested in potential scope of this or subsequent applications should understand that broader claims may be presented at a later date in this case, in a case claiming the benefit of this case, or in any continuation in spite of any preliminary amendments, other amendments, claim language, or arguments presented, thus throughout the pendency of any case there is no intention to disclaim or surrender any potential subject matter. It should be understood that if or when broader claims are presented, such may require that any relevant prior art that may have been considered at any prior time may need to be re-visited since it is possible that to the extent any amendments, claim language, or arguments presented in this or any subsequent application are considered as made to avoid such prior art, such reasons may be eliminated by later presented claims or the like. Both the examiner and any person otherwise interested in existing or later potential coverage, or considering if there has at any time been any possibility of an indication of disclaimer or surrender of potential coverage, should be aware that no such surrender or disclaimer is ever intended or ever exists in this or any subsequent application. Limitations such as arose in *Hakim v. Cannon Avent Group*, PLC, 479 F.3d 1313 (Fed. Cir 2007), or the like are expressly not intended in this or any subsequent related matter. In addition, support should be understood to exist to the degree required under new matter laws—including but not limited to European Patent Convention Article 123 (2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrases "comprising", "including", "containing", "characterized by" and "having" are used to maintain the "open-end" claims herein, according to traditional claim interpretation including that discussed in MPEP § 2111.03. Thus, unless the context requires otherwise, it should be understood that the terms "comprise" or variations such as "comprises" or "comprising", "include" or variations such as "includes" or "including", "contain" or variations such as "contains" and "containing", "characterized by" or variations such as "characterizing by", "have" or variations such as "has" or "having", are intended to imply the inclusion of a stated element or step or group of elements or steps but not the exclusion of any other element or step or group of elements or steps. Such terms should be interpreted in their most expansive form so as to afford the applicant the broadest coverage legally permissible. The use of the phrase, "or any other claim" is used to provide support for any claim to be dependent on any other claim, such as another dependent claim, another independent claim, a previously listed claim, a subsequently listed claim, and the like. As one clarifying example, if a claim were dependent "on claim 9 or any other claim" or the like, it could be re-drafted as dependent on claim 1, claim 8, or even claim 11 (if such were to exist) if desired and still fall with the disclosure. It should be understood that this phrase also provides support for any combination of elements in the claims and even incorporates any desired proper antecedent basis for certain claim combinations such as with combinations of method, apparatus, process, and the like claims.

Finally, any claims set forth at any time are hereby incorporated by reference as part of this description of the various embodiments of the application, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

What is claimed is:

1. A tower crane boom rail heat application apparatus comprising:

an apparatus configured for use on a tower crane, said tower crane comprising:

a tower crane boom having a length;

a trolley configured for movement along at least a portion of said length of said tower crane boom;

a tower crane boom rail disposed along said portion of said length of said tower crane boom with which said trolley moves for said movement along said portion of said length of said tower crane boom;

at least one movement element of said trolley configured to use a surface of said tower crane boom rail for said movement along said portion of said length of said tower crane boom;

an unobstructed movement element travel space of said surface of said tower crane boom rail through which said movement element of said trolley is configured to move;

an available remainder space of said surface of said tower crane boom rail exclusive of said unobstructed movement element travel space;

and said apparatus comprising:

a heat source configured to apply heat to said unobstructed movement element travel space of said surface of said tower crane boom rail;

a space available mount of said heat source configured to occupy only said available remainder space of said surface of said tower crane boom rail, and wherein said space available mount comprises a wire assembly having a heating wire disposed within a channel, and further comprising a fill material between said channel and said heating wire, and wherein said fill material comprises a fluid fill material, and wherein said wire assembly further comprises at least one wire strap having at least a portion disposed against said heating wire and at least one channel strap having at least a portion disposed against said channel, and wherein said fluid fill material fills the remaining space within said channel, and wherein said at least one channel strap having at least a portion disposed against said channel comprises said at least one channel strap having at least a portion welded to said channel.

2. The tower crane boom rail heat application apparatus as described in claim 1 wherein said tower crane boom rail comprises a rectangular tube.

3. The tower crane boom rail heat application apparatus as described in claim 2 wherein said rectangular tube comprises an approximately 5 inch by approximately 5 inch rectangular tube.

4. The tower crane boom rail heat application apparatus as described in claim 2 wherein said rectangular tube comprises a rectangular tube having one side having a width from 2 inches wide to 10 inches wide.

5. The tower crane boom rail heat application apparatus as described in claim 1 wherein said surface of said tower crane boom rail comprises a flat surface portion of said tower crane boom rail, wherein said movement element of said trolley comprises a roller, wherein said unobstructed movement element travel space comprises a roller path of said flat surface portion, and wherein said available remainder space comprises a space of said flat surface portion.

6. The tower crane boom rail heat application apparatus as described in claim 5 wherein said flat surface portion has a width of approximately 5 inches, wherein said roller has a width of approximately 2 inches, wherein said roller path has a width of approximately 2 inches, and wherein said available remainder space has a width of approximately 3 inches.

7. The tower crane boom rail heat application apparatus as described in claim 6 further comprising a lace footprint space occupying said flat surface portion exclusive of said roller path and having a clearance not exceeding 0.5 inches within said available remainder space of said flat surface portion of said surface of said tower crane boom rail.

8. The tower crane boom rail heat application apparatus as described in claim 1 wherein said heat source comprises an elongate uniform distribution heat source.

9. The tower crane boom rail heat application apparatus as described in claim 1 wherein said heat source comprises a heat source selected from the group consisting of sufficient to melt snow from said unobstructed movement element travel space and sufficient to melt ice from said unobstructed movement element travel space.

10. The tower crane boom rail heat application apparatus as described in claim 1 wherein said heat source comprises a heating wire.

11. The tower crane boom rail heat application apparatus as described in claim 10 wherein said heating wire has a diameter not exceeding 0.24 inches.

12. The tower crane boom rail heat application apparatus as described in claim 1 wherein a space comprises said available remainder space lacking clamp sites.

13. The tower crane boom rail heat application apparatus as described in claim 1 wherein said available remainder space comprises a lace footprint restricted said available remainder space.

14. The tower crane boom rail heat application apparatus as described in claim 1 wherein said space available mount comprises said space available mount configured not to impede said unobstructed movement element travel space.

15. The tower crane boom rail heat application apparatus as described in claim 1 wherein said channel has a width not exceeding 0.625 inches.

16. The tower crane boom rail heat application apparatus as described in claim 1 wherein said heating wire has a width not exceeding 0.24 inches.

17. The tower crane boom rail heat application apparatus as described in claim 1 wherein said fluid fill material comprises a silicone sealant.

18. The tower crane boom rail heat application apparatus as described in claim 1 wherein said at least one channel strap and said at least one wire strap comprise adjacent strap pairs.

19. The tower crane boom rail heat application apparatus as described in claim 1 wherein said channel comprises a rectangular channel and said at least one wire strap comprises a rounded wire strap and said at least one channel strap comprises a rounded channel strap.

20. The tower crane boom rail heat application apparatus as described in claim 1 wherein said at least one wire strap further comprises a tab extending beyond said channel or wherein said at least one channel strap further comprises a tab extending beyond said channel.

21. The tower crane boom rail heat application apparatus as described in claim 20 wherein each said tab extends up to 0.5 inches beyond said channel.

22. The tower crane boom rail heat application apparatus as described in claim 20 wherein each said tab is joined to a surface of said available remainder space with adhesive.

23. The tower crane boom rail heat application apparatus as described in claim 1 wherein said channel, said heating wire, and said fill material form a base of said wire assembly, and further comprising at least a portion of said base of said wire assembly joined to a surface of said available remainder space with adhesive.

24. The tower crane boom rail heat application apparatus as described in claim 15 further comprising a plurality of wire assemblies including said wire assembly disposed within said available remainder space between a plurality of lace footprint spaces of said tower crane boom rail.

25. The tower crane boom rail heat application apparatus as described in claim 24 wherein said wire assembly comprises a length of approximately 68 inches.

26. The tower crane boom rail heat application apparatus as described in claim 24 wherein said wire assembly comprises a length of approximately 53 inches.

27. The tower crane boom rail heat application apparatus as described in claim 24 further comprising at least one exposed heating wire section within said available remainder space connecting at least two of said plurality of wire assemblies and clearing at least one of said plurality of lace footprint spaces.

28. The tower crane boom rail heat application apparatus as described in claim 27 wherein said clearance around said at least one of said plurality of lace footprint spaces within said available remainder space through which said at least one exposed wire section is routed does not exceed 0.5 inches.

* * * * *